(12) United States Patent
Banford et al.

(10) Patent No.: US 10,620,933 B2
(45) Date of Patent: *Apr. 14, 2020

(54) TECHNIQUES FOR EFFICIENT APPLICATION CONFIGURATION PATCHING

(71) Applicant: ORACLE INTERNATIONAL CORPORATION, Redwood Shores, CA (US)

(72) Inventors: Jeremy Evan Banford, San Francisco, CA (US); Michael R. Blevins, Volcano, CA (US); David Price, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 15/876,710

(22) Filed: Jan. 22, 2018

(65) Prior Publication Data

US 2018/0143820 A1 May 24, 2018

Related U.S. Application Data

(63) Continuation of application No. 15/080,384, filed on Mar. 24, 2016, now Pat. No. 9,886,263.
(Continued)

(51) Int. Cl.
*G06F 8/65* (2018.01)
*G06F 8/658* (2018.01)

(52) U.S. Cl.
CPC .............. *G06F 8/65* (2013.01); *G06F 8/658* (2018.02)

(58) Field of Classification Search
CPC ................................. G06F 8/658; G06F 8/65
See application file for complete search history.

(56) References Cited

U.S. PATENT DOCUMENTS

| 6,434,744 B1 * | 8/2002 | Chamberlain | ............ G06F 8/65 717/168 |
| 6,760,908 B2 | 7/2004 | Ren | |

(Continued)

OTHER PUBLICATIONS

"AppUpdater", CodePlex Project Hosting for Open Source Software retrieved from https://appupdater.codeplex.com/ on Oct. 2, 2015, 2006-2017, 2 pages.
(Continued)

*Primary Examiner* — Viva Miller
(74) *Attorney, Agent, or Firm* — Kilpatrick Townsend & Sotckton LLP

(57) ABSTRACT

Techniques are disclosed for application configuration patching. Certain techniques are disclosed herein that utilize a configuration patching module (CPM) tool using a single workflow to perform application configuration patching. The CPM can receive a set of one or more binary patches for one or more applications a set of one or more binary patches for one or more applications, and a set of one or more patch metadata declarations for the one or more applications which correspond to at least one of the binary patches. A set of one or more actions can be identified from the set of patch metadata declarations. The CPM can generate a configuration patching execution plan including a set of one or more steps to be performed to implement the set of actions, and execute the set of steps of the configuration patching execution plan.

15 Claims, 15 Drawing Sheets

Related U.S. Application Data

(60) Provisional application No. 62/137,629, filed on Mar. 24, 2015.

(56) References Cited

U.S. PATENT DOCUMENTS

| | | | | |
|---|---|---|---|---|
| 7,370,092 | B2* | 5/2008 | Aderton | H04L 41/046 709/220 |
| 7,555,749 | B2* | 6/2009 | Wickham | G06F 8/65 717/168 |
| 7,853,943 | B2* | 12/2010 | McCaleb | G06F 8/65 709/220 |
| 8,171,547 | B2* | 5/2012 | Thorley | G06F 21/552 713/1 |
| 9,886,263 | B2 | 2/2018 | Banford et al. | |
| 10,282,187 | B2 | 5/2019 | Price et al. | |
| 2002/0059567 | A1* | 5/2002 | Minamide | G06F 8/51 717/151 |
| 2004/0111719 | A1* | 6/2004 | Civlin | G06F 8/60 717/159 |
| 2005/0207553 | A1 | 9/2005 | Fleck et al. | |
| 2006/0048129 | A1* | 3/2006 | Napier | G06F 8/62 717/168 |
| 2006/0184652 | A1* | 8/2006 | Teodosiu | H03M 7/30 709/221 |
| 2006/0288091 | A1 | 12/2006 | Oh et al. | |
| 2007/0106979 | A1* | 5/2007 | Felts | G06F 8/60 717/124 |
| 2007/0106980 | A1* | 5/2007 | Felts | G06F 8/65 717/124 |
| 2007/0169082 | A1* | 7/2007 | Lam | G06F 8/658 717/168 |
| 2007/0265094 | A1 | 11/2007 | Tone et al. | |
| 2007/0294668 | A1* | 12/2007 | Mohindra | G06F 8/36 717/120 |
| 2008/0084820 | A1 | 4/2008 | Aoki et al. | |
| 2008/0098099 | A1* | 4/2008 | Khasnis | G06F 8/61 709/222 |
| 2008/0130639 | A1* | 6/2008 | Costa-Requena | G06F 8/65 370/389 |
| 2008/0163192 | A1* | 7/2008 | Jha | G06F 8/65 717/173 |
| 2010/0031239 | A1* | 2/2010 | Keromytis | G06F 11/3688 717/128 |
| 2010/0218176 | A1* | 8/2010 | Spanner | G06F 11/368 717/170 |
| 2011/0197175 | A1* | 8/2011 | Bouz | G06F 8/658 717/107 |
| 2011/0225575 | A1* | 9/2011 | Ningombam | G06F 8/65 717/170 |
| 2012/0137278 | A1* | 5/2012 | Draper | G06F 8/65 717/170 |
| 2012/0304172 | A1* | 11/2012 | Greifeneder | G06F 9/45504 718/1 |
| 2013/0305252 | A1* | 11/2013 | Venkataraman | G06F 3/0653 718/103 |
| 2014/0143767 | A1* | 5/2014 | Nigul | G06F 8/71 717/170 |
| 2014/0156742 | A1* | 6/2014 | Liu | H04L 67/42 709/203 |
| 2015/0007262 | A1 | 1/2015 | Aissi et al. | |
| 2015/0089656 | A1* | 3/2015 | Pappas | G06F 16/148 726/25 |
| 2016/0004528 | A1 | 1/2016 | Price et al. | |
| 2016/0283219 | A1* | 9/2016 | Banford | G06F 8/658 |

OTHER PUBLICATIONS

Final Office Action for U.S. Appl. No. 14/791,220, dated Oct. 3, 2017, 40 pages.

Non-Final Office Action for U.S. Appl. No. 14/791,220, dated Feb. 3, 2017, 23 pages.

Non-Final Office Action for U.S. Appl. No. 15/080,384, dated Mar. 23, 2017, 16 pages.

Notice of Allowance for U.S. Appl. No. 15/080,384, dated Sep. 25, 2017, 8 pages.

Non Final Office Action for U.S. Appl. No. 14/791,220, dated Apr. 13, 2018, 36 pages.

Non-Final Office Action for U.S. Appl. No. 16/370,678, dated Nov. 20, 2019, 10 pages.

* cited by examiner

```xml
<?xml version="1.0" encoding="UTF-8" standalone="yes"?>
<configurationMetadata creationTime="20140213004214Z" id="0d42d683-e257-46c9-90bd-c36a288d205d">
  <schemaVersion>1.0</schemaVersion>
  <action id="2b906422-976e-41b1-b0e5-9225f4ab3674">          ← 310
    <type>CLASS</type>                                        ← 315
    <name>oracle.fmwplatform.action.FeatureEnablingAction</name>  ← 317
    <category>OFFLINE</category>                              ← 320
    <order>DEFAULT</order>                                    ← 325
    <failureMode>WARN</failureMode>                           ← 330
    <parameter>
      <name>FEATURE_TO_ENABLE</name>
      <value>FEATURE_X</value>
    </parameter>
    <prereqInventoryEntryReference>
      <inventoryType>RECORDED_ACTIONS</inventoryType>
      <key>oracle.product.FeatureXWired</key>
    </prereqInventoryEntryReference>
    <inventoryEntryReference>
      <inventoryType>RECORDED_ACTIONS</inventoryType>
      <key>oracle.product.FeatureXEnabled</key>
    </inventoryEntryReference>
    <lifecycleHint>DOMAIN_CREATION</lifecycleHint>
  </action>
</configurationMetadata>
```

FIG. 3

```xml
<!-- cumulative patch 1 config-actions.xml contents -->

<configurationMetadata creationTime="20140213004214Z" id="0d42d683-e257-46c9-90bd-c36a288d205d">
  <schemaVersion>1.0</schemaVersion>
  <action id="2b906422-976e-41b1-b0e5-9225f4ab3674">
    <type>CLASS</type>
    <name>oracle.myproduct.action.ExposeDatabaseConnectionTunables</name>
    <category>ONLINE</category>
    <order>DEFAULT</order>
    <failureMode>STOP</failureMode>
    <inventoryEntryReference>
      <inventoryType>RECORDED_ACTIONS</inventoryType>
      <key>oracle.myproduct.DBTunablesEnabled</key>
    </inventoryEntryReference>
  </action>
  <action id="15a65001-3834-4cfc-b6d4-d3f4442bfc05">
    <type>CLASS</type>
    <name>oracle.fmwplatform.action.DBConnectionPoolFlushAction</name>
    <category>ONLINE</category>
    <order>LAST</order>
    <failureMode>WARN</failureMode>
    <executionDirective>DEDUPLICATION_ELIGIBLE</executionDirective>
  </action>
</configurationMetadata>

<!-- cumulative patch 2 config-actions.xml contents -->

<configurationMetadata creationTime="20140518041235Z" id="11ec044c-c4a3-46f6-9e18-81f9ec830eec">
  <schemaVersion>1.0</schemaVersion>
  <action id="520f036d-2e99-4cf8-aad8-7efe0986c45f">
    <type>CLASS</type>
    <name>oracle.myproduct.action.ExposeDatabaseConnectionTunables</name>
    <category>ONLINE</category>
    <order>DEFAULT</order>
    <failureMode>STOP</failureMode>
    <inventoryEntryReference>
      <inventoryType>RECORDED_ACTIONS</inventoryType>
      <key>oracle.myproduct.DBTunablesEnabled</key>
    </inventoryEntryReference>
  </action>
  <action id="22ca52b2-1020-4ee5-a8d2-448800ed73b0">
    <type>CLASS</type>
    <name>oracle.myproduct.action.ExposeEvenMoreDBTunables</name>
    <category>ONLINE</category>
    <order>DEFAULT</order>
    <failureMode>STOP</failureMode>
    <prereqInventoryEntryReference>
      <inventoryType>RECORDED_ACTIONS</inventoryType>
      <key>oracle.myproduct.DBTunablesEnabled</key>
    </prereqInventoryEntryReference>
    <inventoryEntryReference>
      <inventoryType>RECORDED_ACTIONS</inventoryType>
      <key>oracle.myproduct.DBTunablesEnabledRound2</key>
    </inventoryEntryReference>
  </action>
  <action id="15a65001-3834-4cfc-b6d4-d3f4442bfc05">
    <type>CLASS</type>
    <name>oracle.fmwplatform.action.DBConnectionPoolFlushAction</name>
    <category>ONLINE</category>
    <order>LAST</order>
    <failureMode>WARN</failureMode>
    <executionDirective>DEDUPLICATION_ELIGIBLE</executionDirective>
  </action>
</configurationMetadata>

<!-- precondition recorded-actions.xml contents (2a) -->

<ConfigurationChangeInventoryMetadata>
</ConfigurationChangeInventoryMetadata>
```

...continuation

```
<!-- precondition recorded-actions.xml contents (2b) -->

<ConfigurationChangeInventoryMetadata>
 <InventoryEntry>
  <Key>oracle.myproduct.DBTunablesEnabled</Key>
  <Date>20140421191434Z</Date>
  <ActionID>2b906422-976e-41b1-b0e5-9225f4ab3674</ActionID>
  <PatchID>0d42d683-e257-46c9-90bd-c36a288d205d</PatchID>
 </InventoryEntry>
</ConfigurationChangeInventoryMetadata>

<!-- postcondition recorded-actions.xml contents (2a) -->

<ConfigurationChangeInventoryMetadata>
 <InventoryEntry>
  <Key>oracle.myproduct.DBTunablesEnabled</Key>
  <Date>20140701082215Z</Date>
  <ActionID>520f036d-2e99-4cf8-aad8-7efe0986c45f</ActionID>
  <PatchID>11ec044c-c4a3-46f6-9e18-81f9ec830eec</PatchID>
 </InventoryEntry>
 <InventoryEntry>
  <Key>oracle.myproduct.DBTunablesEnabledRound2</Key>
  <Date>20140701082308Z</Date>
  <ActionID>22ca52b2-1020-4ee5-a8d2-448800ed73b0</ActionID>
  <PatchID>11ec044c-c4a3-46f6-9e18-81f9ec830eec</PatchID>
 </InventoryEntry>
</ConfigurationChangeInventoryMetadata>

<!-- postcondition recorded-actions.xml contents (2b) -->

<ConfigurationChangeInventoryMetadata>
        <InventoryEntry>
                <Key>oracle.myproduct.DBTunablesEnabled</Key>
                <Date>20140421191434Z</Date>
                <ActionID>2b906422-976e-41b1-b0e5-9225f4ab3674</ActionID>
                <PatchID>0d42d683-e257-46c9-90bd-c36a288d205d</PatchID>
        </InventoryEntry>
        <InventoryEntry>
                <Key>oracle.myproduct.DBTunablesEnabledRound2</Key>
                <Date>201400630151455Z</Date>
                <ActionID>22ca52b2-1020-4ee5-a8d2-448800ed73b0</ActionID>
                <PatchID>11ec044c-c4a3-46f6-9e18-81f9ec830eec</PatchID>
        </InventoryEntry>
</ConfigurationChangeInventoryMetadata>
```

FIG. 10B

```xml
<!-- patch 1 config-actions.xml contents -->
<configurationMetadata creationTime="20141202202045Z" id="f9a3800c-131a-4362-abbc-a149f2298b0d">
  <schemaVersion>1.0</schemaVersion>
  <action id="0f0fd360-90ef-453e-b96e-904ccba1bb99">
    <type>CLASS</type>
    <name>oracle.myproduct.action.Bug13936871Workaround</name>
    <category>ONLINE</category>
    <order>DEFAULT</order>
    <failureMode>STOP</failureMode>
    <prereqInventoryEntryReference>
      <inventoryType>RECORDED_ACTIONS</inventoryType>
      <key>oracle.myproduct.DBTunablesEnabled</key>
    </prereqInventoryEntryReference>
    <inventoryEntryReference>
      <inventoryType>RECORDED_ACTIONS</inventoryType>
      <key>oracle.myproduct.Bug13936871Workaround</key>
    </inventoryEntryReference>
  </action>
  <action id="27fd2d20-d6bb-432c-8b22-306406a5f50d">
    <type>CLASS</type>
    <name>oracle.fmwplatform.action.DBConnectionPoolFlushAction</name>
    <category>ONLINE</category>
    <order>LAST</order>
    <failureMode>WARN</failureMode>
    <executionDirective>DEDUPLICATION_ELIGIBLE</executionDirective>
  </action>
</configurationMetadata>

<!-- patch 2 config-actions.xml contents -->
<configurationMetadata creationTime="20140109115411Z" id="7eafe211-66fa-40b6-b833-265900c0d822">
  <schemaVersion>1.0</schemaVersion>
  <action id="93264aea-0b4c-48e1-a1a0-fbf5b3aa1f90">
    <type>CLASS</type>
    <name>oracle.myproduct.action.HandleJDBCDriverUpgrade</name>
    <category>ONLINE</category>
    <order>DEFAULT</order>
    <failureMode>STOP</failureMode>
    <inventoryEntryReference>
      <inventoryType>RECORDED_ACTIONS</inventoryType>
      <key>oracle.myproduct.JDBCDriverUpgraded</key>
    </inventoryEntryReference>
  </action>
  <action id="e81954b7-afb9-4287-82d6-f18b9cbce348">
    <type>CLASS</type>
    <name>oracle.fmwplatform.action.DBConnectionPoolFlushAction</name>
    <category>ONLINE</category>
    <order>LAST</order>
    <failureMode>WARN</failureMode>
    <executionDirective>DEDUPLICATION_ELIGIBLE</executionDirective>
  </action>
</configurationMetadata>

<!-- precondition recorded-actions.xml contents -->

<ConfigurationChangeInventoryMetadata>
    <InventoryEntry>
        <Key>oracle.myproduct.DBTunablesEnabled</Key>
        <Date>20140421191434Z</Date>
        <ActionID>2b906422-976e-41b1-b0e5-9225f4ab3674</ActionID>
        <PatchID>0d42d683-e257-46c9-90bd-c36a288d205d</PatchID>
    </InventoryEntry>
</ConfigurationChangeInventoryMetadata>

<!-- postcondition recorded-actions.xml contents -->

<ConfigurationChangeInventoryMetadata>
    <InventoryEntry>
        <Key>oracle.myproduct.DBTunablesEnabled</Key>
        <Date>20140421191434Z</Date>
        <ActionID>2b906422-976e-41b1-b0e5-9225f4ab3674</ActionID>
        <PatchID>0d42d683-e257-46c9-90bd-c36a288d205d</PatchID>
    </InventoryEntry>
    <InventoryEntry>
        <Key>oracle.myproduct.Bug13936871Workaround</Key>
        <Date>20150121134523Z</Date>
        <ActionID>0f0fd360-90ef-453e-b96e-904ccba1bb99</ActionID>
        <PatchID>f9a3800c-131a-4362-abbc-a149f2298b0d</PatchID>
    </InventoryEntry>
        <InventoryEntry>
        <Key>oracle.myproduct.JDBCDriverUpgraded</Key>
        <Date>20150121134550Z</Date>
        <ActionID>93264aea-0b4c-48e1-a1a0-fbf5b3aa1f90</ActionID>
        <PatchID>7eafe211-66fa-40b6-b833-265900c0d822</PatchID>
    </InventoryEntry>
</ConfigurationChangeInventoryMetadata>
```

*FIG. 10C*

TECHNIQUES FOR EFFICIENT APPLICATION CONFIGURATION PATCHING

CROSS-REFERENCE TO RELATED APPLICATION

This application is a continuation application of U.S. application Ser. No. 15/080,384, filed on Mar. 24, 2016 titled "TECHNIQUES FOR EFFICIENT APPLICATION CONFIGURATION PATCHING," now allowed, which claims the benefit and priority of U.S. Provisional Application No. 62/137,629, filed on Mar. 24, 2015 titled "TECHNIQUES FOR EFFICIENT APPLICATION CONFIGURATION PATCHING," which are herein incorporated by reference in their entirety for all purposes.

FIELD

Embodiments of the invention relate to the field of computing systems; and more specifically to methods, apparatuses, and systems for efficient application configuration patching.

BACKGROUND

Keeping software up-to-date in large-scale cloud infrastructure systems through software patching presents significant challenges, especially when compared to performing similar tasks in corporate computing environments or smaller-scale data centers. For example, compared to many traditional corporate data center installations, cloud infrastructure environments often include many different types of computing systems utilizing hardware from many different vendors. Further, these heterogeneous server computers may execute a large number of different operating systems—each requiring different patches—that further may execute many different types and/or versions of applications (e.g., web server applications, database server applications, etc.) that similarly require different patches. Moreover, the application of these different patches may need to be performed according to a particular ordering and updating. Further, these operating systems and/or applications may require the use of application-specific update tools. Accordingly, keeping the large numbers of applications executing across a wide variety of operating systems and server computing devices effectively patched can be tremendously difficult and typically involves a large amount of human effort.

Further complicating cloud infrastructure software patching is the need to make configuration type changes during these patching processes.

As described above, an administrator regularly needs to apply patches to an application deployment to address functional bugs, security or performance issues, and so on. Patches typically include updates to relatively small portions of binary files that were originally provided for an application via a product installer (or a previous patch), and when applied, these updates replace the previous copies on disk. However, in order for the patched deployment to continue functioning properly, it is often the case that these updated binaries are to be accompanied by changes to non-binary application artifacts which also drive the deployment.

Thus, configuration files, in-database data, and/or database schemas utilized by applications (herein referred to under the common label of "configuration data") may all require specific actions to be performed effecting these changes, as well as changes to configurations present in other applications—such as those upon which a patched application depends or depend on it. Further complicating matters is that, depending on the nature of the application and the changes required, configuration changes (or "actions") may need be performed while a deployed application is offline, after the deployed application is brought back online, or both.

Some approaches to performing application patching together with configuration patching include one or a combination of several techniques.

In some deployments, configuration-related changes are described as actions needing to be accomplished manually, and may be documented with an associated application patch (e.g., within an included README file) or with external reference (e.g., a support page on a vendor web site).

Another approach is to utilize configuration-changing actions that may be semi-automated, meaning that tooling is provided that is to be invoked by the administrator at a defined point(s) in the patching process. The administrator may then need to provide information unique to the target deployment (e.g., file system paths, hostnames/ports, passwords) in order for this tooling to perform its job.

Another approach is to utilize configuration-changing actions that are fully automated, via the inclusion of a shell script (or similar) that a tool performing binary patching knows how to invoke.

However, these approaches have issues in terms of efficiency, repeatability, and traceability. These issues can be manageable if only one or a small number of patches need to be applied to a single product, but often a deployment is composed of a large set of discrete products and components, and a large number of patches to all those will be applied together. This greatly magnifies the problem—an administrator now has to manually orchestrate actions spread out among a large set of patches and their "manual" configuration changes, each of which may use a combination of approaches. Moreover, the documented per-patch steps can include a significant overlap in terms of common actions performed by each patch, such as a clearing of a cache that in reality may only need to be run once. Additionally, the correct, but often unstated, ordering of the actions to be performed among multiple patches is often critical to prevent issues, but administrators are typically left completely on their own, to muddle through the deployment patching process using trial and error, which can result in significant system downtime.

Accordingly, there is a tremendous need to find simplified mechanisms to allow for configuration patching of systems, including within large-scale cloud infrastructure systems.

BRIEF SUMMARY

The present disclosure relates generally to computing systems; and more specifically, to methods, apparatuses, and systems for application configuration patching. Certain techniques are disclosed herein that utilize a single configuration patching module (CPM) tool using a single workflow to perform application configuration patching for one or many applications in an automated, efficient, traceable, secure manner.

In some embodiments, actions needed for a given patch are declared via patch metadata declarations. The source of the patch metadata declarations may vary. In some embodiments, declarations may be contained within the binary patch file itself. In some embodiments, declarations may be provided within files aggregated alongside a set of one or more binary patches. In some embodiments, declarations may be obtained via a network request to an online service or application programming interface (API). A list of identifiers for the binary patches of interest may be provided as part of the request. The actions themselves can be in the form of compiled code, an interpreted script or scripts, or combinations thereof. For example, the actions could be Java classes, Python code, or scripts written to a specific interface. In some embodiments, actions are performed in a consistently-ordered fashion, which is deterministic for a given deployment and set of patches. A set of patches can include one or more patches.

The actions executed by the CPM tool can also be optimized. First, duplicate action declarations present for multiple patches (for example, clear a cache) can be reduced to a single action executed. Second, an inventory can be maintained of "persisted actions"—e.g., changes deemed important that they only be run once (for performance or idempotency reasons, for example), or that they be tracked on an ongoing basis as information for other system tools. For example, a future upgrade tool can determine, using these persisted actions, which database schema changes had been previously applied via patches. Any actions declared in the patches that are recorded in inventory as having already been applied can then be skipped (i.e., not executed).

In some embodiments, the CPM tool can be run twice during a system patching process—once while the deployment is offline, and again once brought back online. In some embodiments, the configured actions and metadata can be declared as under which phase they need to be run. In some embodiments, the CPM tool can be run only once or can be run more than two times in order to perform a patching process. Further, the CPM tool can also be identified as a CPM.

In some embodiments, the CPM tool is provided the set of applied patches and the targeted deployment. The CPM tool can analyze both the applied patches and the targeted deployment to generate an execution plan. The plan can include all actions that are to be run (e.g., in offline or online mode) from all patches, in a single, properly-ordered set of steps. A set of steps can include one or more steps. The plan, in some embodiments, includes dependency resolution— e.g., if action 456 requires that action 123 (from a same or a different patch) must have been run first, then action 123 will be scheduled to run first.

In some embodiments, the CPM tool can then execute the plan, with consistent and rich reporting of results, including errors if they occur. Each executed action can utilize provided topology information (e.g., file system paths, application server names, hostnames/ports, etc.) and credential information (e.g., usernames, passwords, keys) required for making changes. In some embodiments, inventory entries are recorded as applicable actions are executed for use in future patch or other lifecycle activities.

Some embodiments also support a prerequisite or "test" execution, in which all actions will be invoked in a way that they make no actual changes, but can report back upon whether the ultimate execution will succeed. This can allow for environmental issues (for example, a file an action will need to update cannot be read) to be identified and corrected before any changes are actually made, reducing the chance of error and resulting system downtime.

Accordingly, some embodiments provide ease of use, as there can be a unified, fully-automated approach taken by all products/applications in a deployment for applying changes during patching, using a single tool. This can greatly reduce the mental load on the administrator during the patching process, and scales to any number of patches and/or number of components affected by those patches.

Further, some embodiments provide increased consistency, as an administrator may be responsible for a fleet of similar deployments that are supposed to be "the same", say for production and test, or in production for many customers. This greatly enhances an administrator's ability to keep all deployments in lockstep through patching scenarios. Between inventory-tracking and consistent logging of actions, the administrator can thus be able to verify which changes did or did not occur and verify that multiple deployments are still "the same" (e.g., executing the same software under the same configurations) after patching is complete.

Embodiments further provide increased efficiency, as the time required for patching as a whole can be reduced, as configuration-changing actions are automated, and also can be minimized in their number via deduplication and inventory checks.

Additionally, embodiments provide diagnosability of problems. Based upon the above benefits, a system's support team will not need to be consulted on how to perform such patching. Due to embodiments utilizing deterministic ordering, the set of potential problems that may arise during patching will be reduced or eliminated, while the information available to troubleshoot any problems that might arise is much richer than that provided by ad-hoc approaches.

Embodiments can further provide increased accountability. Patching, from the perspective of a typical product team (or application developer), has historically been viewed as an afterthought and dealt with by "someone else" (e.g., someone on a sustaining team documenting the changes needed to enable a patch on an ad-hoc basis). Thus, the application developer may not be viewed as responsible when these ad-hoc enablement needs occur, regardless of frequency, while the sustaining team may not have the ability to reengineer the product to improve matters. Using these described embodiments, an application/product development team owns the actions that make changes, and is thus incentivized to enhance the product such that over time they reduce or eliminate the need for such actions.

Moreover, embodiments can be utilized in a variety of application deployment environments, ranging from small-scale systems to those composed from a large number of discrete products and components, and which use various mechanisms and locations to hold application artifacts.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 3 illustrates an example of metadata for configuration patching according to some embodiments.

FIGS. 10A, 10B, and 10C illustrate example metadata according to some embodiments.

DETAILED DESCRIPTION

Figure 1:
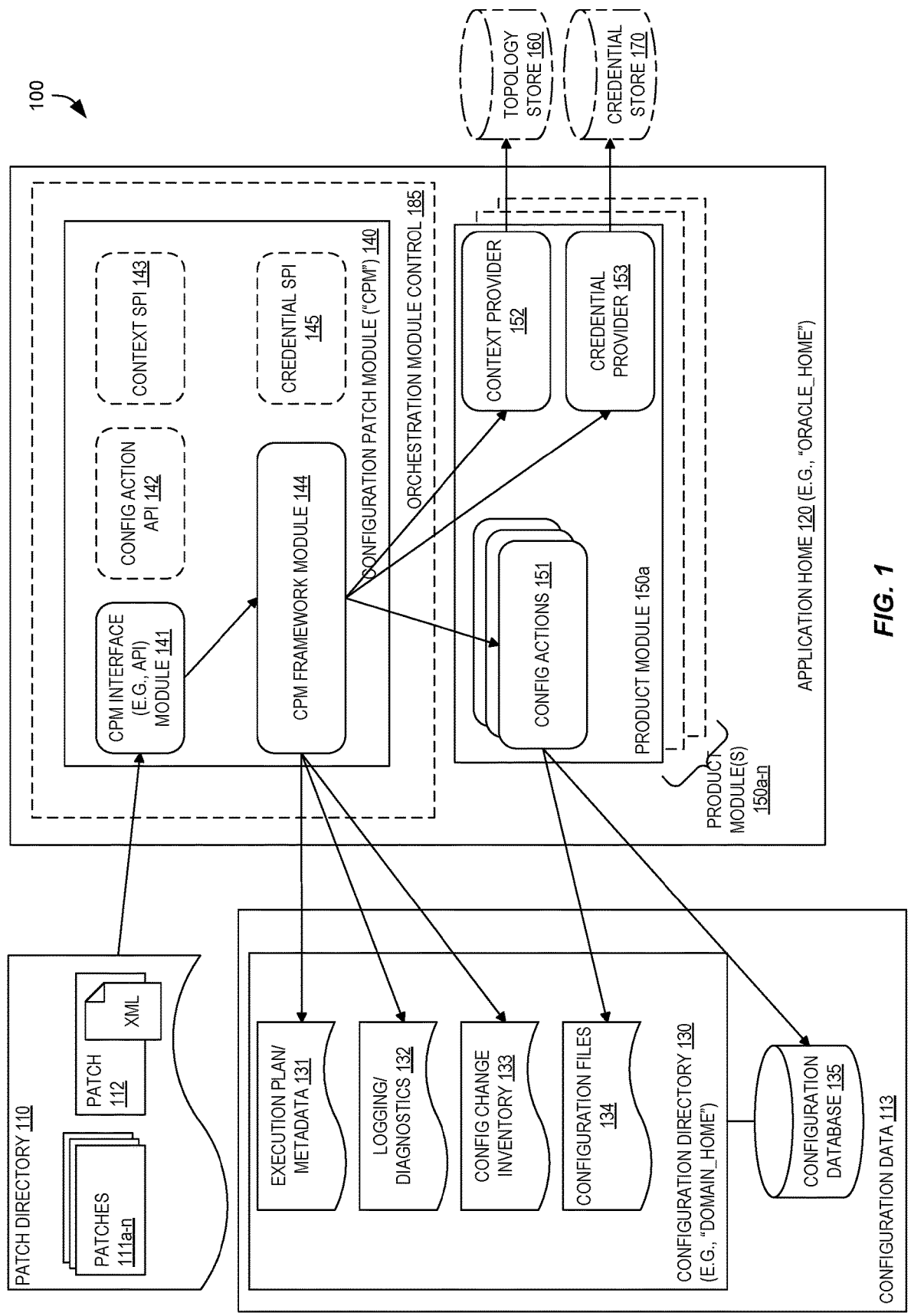
FIG. 1 illustrates a high-level block diagram of a system including a configuration patch module for configuration patching according to some embodiments.

In the following description, for the purposes of explanation, specific details are set forth in order to provide a thorough understanding of embodiments of the invention. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

The present disclosure relates generally to computing systems; and more specifically, to methods, apparatuses, and systems for application configuration patching. Certain techniques are disclosed herein that utilize a single configuration patching module (CPM) tool using a single workflow to perform application configuration patching for one or many applications in an automated, efficient, traceable, secure manner.

Previously, configuration change instructions to be manually executed by a system administrator, in some systems, are placed in a README.txt file associated with a patch. These instructions typically vary by product, and often vary by individual patch for a product, in terms of the tools to be invoked and sequencing of steps, and even in the language used in the readme for steps which are identical. For example, a patch may include a set of steps to be run when the targeted server instances are offline, another whose steps require those first be brought back up, and a third patch listing steps of both kinds. This approach is ad-hoc and error-prone, and creates repeatability and verification issues, especially across environments which are supposed to be consistent (e.g., test vs. production environments). Further, when mistakes are made in running the configuration change steps, functional problems can result in the product patched, bugs being filed as a result, and possibly a need to roll back the patch entirely.

However, embodiments described herein allow for application configuration changes to be declared and executed in an automated fashion and still provide diagnosability, which can greatly reduce issues related to patch applicability, efficiency, and reliability.

Embodiments can also track "persisted configuration" steps recorded for consistency checking and preventing the re-running of steps that have already been completed for a given deployment. Additionally, embodiments can utilize a canonical log location/format that can hold execution results of configuration changes applied, allowing for centralized analysis/compliance purposes.

In some embodiments, actions needed for a given patch are declared via patch metadata declarations. The source of the patch metadata declarations may vary. In some embodiments, declarations may be contained within the binary patch file itself. In some embodiments, declarations may be provided within files aggregated alongside a set of one or more binary patches. In some embodiments, declarations may be obtained via a network request to an online service or application programming interface (API). A list of identifiers for the binary patches of interest may be provided as part of the request. The actions themselves can be in the form of compiled code, an interpreted script or scripts, or combinations thereof. For example, the actions could be Java classes, Python code, or scripts written to a specific interface. In some embodiments, actions are performed in a consistently-ordered fashion, which is deterministic for a given deployment and set of patches.

The actions executed by the CPM tool can also be optimized. First, duplicate action declarations present for multiple patches (for example, clear a cache) can be reduced to a single action executed. Second, an inventory can be maintained of "persisted actions"—e.g., changes deemed important that they only be run once (for performance or idempotency reasons, for example), or that they be tracked on an ongoing basis as information for other system tools. For example, a future upgrade tool can determine, using these persisted actions, which schema changes had been previously applied via patches. Any actions declared in the patches that are recorded in inventory as having already been applied can then be skipped (i.e., not executed).

In some embodiments, the CPM tool can be run twice during a system patching process—once while the deployment is offline, and again once brought back online. In some embodiments, the configured actions and metadata can be declared as under which phase they need to be run. In some embodiments, the CPM tool can be run only once or can be run more than two times in order to perform a patching process. Further, the CPM tool can also be identified as a CPM.

In some embodiments, the CPM tool is provided the set of applied patches and the targeted deployment. The CPM tool can analyze both the applied patches and the targeted deployment to generate an execution plan. The plan can include all actions that are to be run (e.g., in offline or online mode) from all patches, in a single, properly-ordered set of steps. The plan, in some embodiments, includes dependency resolution—e.g., if action 456 requires that action 123 (from a same or a different patch) must have been run first, then action 123 will be scheduled to run first.

In some embodiments, the CPM tool can then execute the plan, with consistent and rich reporting of results, including errors if they occur. Each executed action can utilize provided topology information (e.g., file system paths, application server names, hostnames/ports, etc.) and credential information (e.g., usernames, passwords, keys) required for making changes. In some embodiments, inventory entries are recorded as applicable actions are executed for use in future patch or other lifecycle activities.

Some embodiments also support a prerequisite or "test" execution, in which the actions can be invoked in a way that they make no actual changes, but report back upon whether the ultimate execution will succeed. This can allow for environmental issues (for example, a file an action will need to update cannot be read) to be identified and corrected before any changes are actually made, reducing the chance of error and resulting system downtime.

Therefore, in accordance with some embodiments, configuration changes and orchestration of the entire patching flow can be performed in a standardized manner.

Before discussing embodiments with reference to the figures, some terminology that may be used herein will be described. These descriptions are not meant to be strictly limiting but used to help the reader understand the nature of the various described features and embodiments disclosed herein. Additionally, in some instances these terms may not be strictly used according to descriptions now presented; it is expressly stated that a person of ordinary skill in the art would be able to understand the various uses of these terms based upon their context.

In this description, the term "application" generally refers to a particular computer program having at least two distinct but interrelated portions—one or more "binaries" (or "binary files") and associated configuration data. An application can also be referred to as a product.

As used herein, a binary can be a file that is executable, or a library file supporting an executable (e.g., including subroutines, classes, etc.), for example. A binary can be a file including executable code that is generated based upon source code written using a programming language. For example, a compiler can be used to translate source code from a programming language into either object code or machine code. Object code needs further processing to become machine code, and machine code is the "native" code of the central processing unit, and thus is ready for execution. These types of compiled computer programs are commonly referred to as executables, binary images, or simply as binaries. Thus, in some instances, a binary may refer to a file in a binary file format storing code for a computer program or that may be used by a computer program.

However, a binary (as used herein) can also refer to source code that may be (in part or whole) in a text file format. For example, some computer programs are stored as a source code (perhaps written in a high-level language such as Perl, PHP, Ruby, JavaScript, Python, etc.) and executed "directly" from its source code format through interpretation. Similarly, some computer programs are stored as a source code (e.g., a Java or C # program, for example) and complied into bytecode, which is then executed. Thus, for the purposes of this disclosure, the term binary can also refer to source code which, though interpretation, emulation, etc., can ultimately be executed as part of a computer program.

Additionally, many applications also utilize configuration data. The term configuration data may be used herein to generally refer to data that is separate from an application binary and can be edited or modified to customize some aspect of the application. Configuration data can sometimes be referred to as "application data" or "runtime data". Configuration data may be in many forms, including plain-text files (e.g., ASCII line-oriented files), etc. For example, some common types of configuration data include "rc" files, INI files, XML files, .NET configuration files (or ".config" files), the Windows registry, command line arguments, etc. Within a database, this may include database schemas or other elements held within a data dictionary, data written aligned to those schemas, etc.

Although the term "application" generally refers to a combination of both binaries and any associated configuration data, the term application may also be used to specifically refer to just the binaries. Based upon the context of the use of this term, those of ordinary skill in the art are immediately able to determine the particular meaning of the term.

As used herein, the term "Binary Patching" may be used to generally refer to patching application (or "product") binaries, which can include replacing binary portions of an application with "new" binary portions that solve a particular problem or somehow improve the application.

As used herein, the term "Patch Directory" may be used to generally refer to a directory (e.g., in a file system) holding patches. In some embodiments, each directory underneath the parent one typically includes a single patch, and is named with a number for that particular patch. Of course, many different naming conventions may be utilized.

As used herein, the term "Configuration Patching" may be generally used to refer to patching an application's associated configuration data to align with the binary patch applied. This can involve the application of a set of steps, which may vary widely. Valid steps include making file changes to underlying files of servers while servers are offline, applying database schema or data modifications, or (e.g., after bringing servers back up) online steps such as deploying something into a container, or invoking a server-hosted interface (such as a RESTful API or MBean) to enable the new configuration applicable to the patch. Steps of some or all of these forms may need to be applied, in an orchestrated fashion, in order to correctly activate a patch and ensure the server is in a solid state after patching.

As used herein, the term "Configuration Action" (or just "Action") may be used to refer to a task to be performed in a configuration patching process. Individual actions may require the use of widely varied interfaces, logic, and dependencies in order to accomplish their tasks. Thus, an action can be associated with a particular patching-related task, and can be associated with one or multiple "steps" used to perform the particular task. For example, an action may indicate that a particular configuration file needs to be changed, and this action can be translated (e.g., by the CPM, using a lookup table or logic, for example) into multiple steps. The multiple steps may include, for example, one or more of: a step of verifying that the file is present, a step of making a backup copy of the file for recovery purposes in case of error, a step of making the changes required within the file, a step of removing the backup copy, a step of clearing a cache so the updated file will be read, etc.

As used herein, the term "Configuration Directory" may be used to refer to a specific file system location holding an application's configuration files that is targeted by a configuration patching process. In this disclosure, a configuration directory may be referred to using the term DOMAIN_HOME.

As used herein, the term "Configuration Change Inventory" (or "change inventory") may be used to refer to a set of entries that track a performed action. A set of entries can include one or more entries. Some of the actions involved in configuration patching are to only be made once for data integrity reasons, or otherwise should only be made once for performance and/or best-practice reasons. The Configuration Change Inventory can hold a set of entries, each of which tracks one such action, and can be used to prevent execution of a single action more than once, and if required, to enforce prerequisite actions that must have been applied before it is safe for a given one to execute. The change inventory may be held within a configuration file 134 (as shown in FIGS. 1 and 10*a-c*), but can also held within the configuration database 135. Further, although a single inventory 133 is shown in FIG. 1, there can be multiple inventories. For example, there can be one inventory held in a file tracking actions which had affected files in the configuration directory 130, and there can be another inventory held in the configuration database 135 tracking actions which had affected the configuration database 135. Further, the inventories could be utilized by the CPM singly or simultaneously.

As used herein, the term "Configuration Patching Phase" refers to a phase or portion of an application patching process where configuration-changes occur (as opposed to a phase where binary changes occur). As in most system administration activities, an overall orchestrated patching process can be broken down into a set of phases. A set of phases can include one or more phases. With regard to configuration patching, multiple phases can be utilized: "offline" (after binary patching has completed, while all servers are still down) and "online" (after servers have been brought back up) are two examples. Of course, it is possible to add more phases, such as targeting different hosts in a given deployment topology, for example. Another potential phase can be a "zero downtime" (ZDT) phase, the execution of which does not require that the associated server/application be halted for patching at all.

In some embodiments, the overall application patching process is defined using one or more supported modes. One mode can be "full", another can be "zero-downtime" or "no-downtime", and a third "offline-only". Of course, in some embodiments different modes can be supported, and in some embodiments more or fewer modes may be supported. When a patching process is started (e.g., by the administrator), one of these modes can be selected. The mode selected is correlated to a set of one or more phases which will be executed as part of the patching process. A given application patching process may not invoke all phases; for example, by definition, no actions which can only be run when the server/application is halted (i.e., the "offline" phase) can be run in a "zero downtime" mode. Conversely, when in the "offline-only" mode, solely the actions designated for the "offline" phase will be run. For example, in a zero down time mode, pre-patch phase and online phase actions can be run. Further, in a full mode, actions in n different phases (e.g., an offline phase, online phase, and/or pre-patch phase, etc.) can be run. Therefore, in a full mode, all types of actions of different types of phases can be run.

In some embodiments, action declarations within a patch may identify the particular phase (or phases) for which the action is eligible for execution. For example, a declaration may identify that it is an "online" action, while another may identify that it is both an "online" and a "ZDT" action (e.g., it can be run as part of either phase). A third may identify itself as applicable to the "offline" phase only.

The combination of the mode and constituent phases determines which configuration actions will be run for a given application patching process, and if that process will satisfy the requirements of the patches input to the process. For example, if the process is initiated in "zero-downtime" mode, and some of the patches contain actions which can only be executed in the "offline" phase, then configuration patching for those patches will not be successfully completed in this mode. Analysis performed at the start of the process can make this determination, and report to the administrator that this mode cannot be used for this set of patches. Instead, a different mode can be selected that will allow for success (e.g., a mode entailing system/application downtime), or some of the patches can be excluded from the current process and deferred until later, when system/application downtime can be taken (i.e., in a defined window acceptable to the users of the application).

FIG. 1 illustrates a high-level block diagram of a system 100 including a configuration patch module 140 for configuration patching according to some embodiments.

FIG. 1 illustrates a Configuration Patch Module (CPM) 140 executing and interacting with a Configuration Directory 130, a Patch Directory 110, and one or more product modules 150 *a-n* to perform efficient application configuration patching.

The patch directory 110, in some embodiments, can be a file system location (local or remote to the executing CPM 140) that can include one or more patches 111*a-n* (e.g., binary patches) and associated configuration patch metadata 112. As described above, in some embodiments, actions needed for a given patch are declared via patch metadata declarations. The source of the patch metadata declarations may vary. In some embodiments, declarations may be contained within the binary patch file itself. In some embodiments, declarations may be provided within files aggregated alongside a set of one or more binary patches. In some embodiments, declarations may be obtained via a network request to an online service or API. A list of identifiers for the binary patches of interest may be provided as part of the request. As illustrated, the patch metadata 112 can be, for example, in a standardized format such as XML. Although a single patch metadata 112 is shown in the figure, there can be more than one patch metadata 112.

The patch directory 110 can be provided to the CPM 140 as a location storing a set of patches (e.g., binary patches 111*a-n* and or configuration patches 112). In some embodiments, a subset of those patches 111*a-n* may have (or include) metadata (e.g., configuration patch metadata 112) showing that they require configuration actions to be completed, and list those actions. The CPM framework module 144 can take this information and assemble or generate a configuration patching execution plan 131, which it then executes. In the process of execution, the CPM framework module 144 can invoke configuration actions 151, obtain information from service provider interface (SPI) providers, and/or query/update the configuration change inventory 133 as required for one or more product modules. Examples of service provider interfaces (SPIs) can include context SPI 143 and credential SPI 145. As shown in FIG. 1, context provider 152 and credential provider 153 are examples of implementations of context SPI 143 and credential SPI 145, respectively. The CPM module 140 can also include a configuration action API 142, a context SPI 143, and a credential SPI 145 and the product module (e.g. product module 150*a*) can also include a context provider 152 and a credential provider 153.

The result can be an updated configuration files 134 and logging/diagnostic information 132 regarding the configuration patching steps performed. As shown in FIG. 1, all in-database application data is a form of configuration, and can be modified by actions similar to configuration files 134. Alternatively, the execution plan 131, logging/diagnostic information 132, configuration change inventory 133 and configuration files 134 can be stored in a configuration database 135. The configuration directory 130 and the configuration database 135 can be grouped together as configuration data 113.

The CPM 140 can retrieve (or be provided) the configuration patch data via an CPM interface 141 (e.g., an application program interface (API), command line interface, etc.), where a CPM framework module 144 can utilize the configuration patch metadata 112 for configuration patching.

As depicted in FIG. 1, the CPM 140 is illustrated as residing at (or within) an "application home" 120 location (e.g., an "ORACLE_HOME"). An application home 120 can refer to the location where an application (e.g., an Oracle Fusion Middleware product such as Oracle HTTP Server, Oracle SOA Suite, Oracle Internet Directory, etc.) is installed and the binaries of that product are being used in a current procedure. Thus, an application home 120 can refer to a location including installed files necessary to host a specific application. For example, a SOA application home can include a directory that includes all binary files comprising the Oracle SOA Suite. Each application home can be associated with multiple application instances.

As depicted herein, the CPM framework module 144 serves to coordinate the set of configuration changes to be executed for each product at a single point in time.

Figure 2:
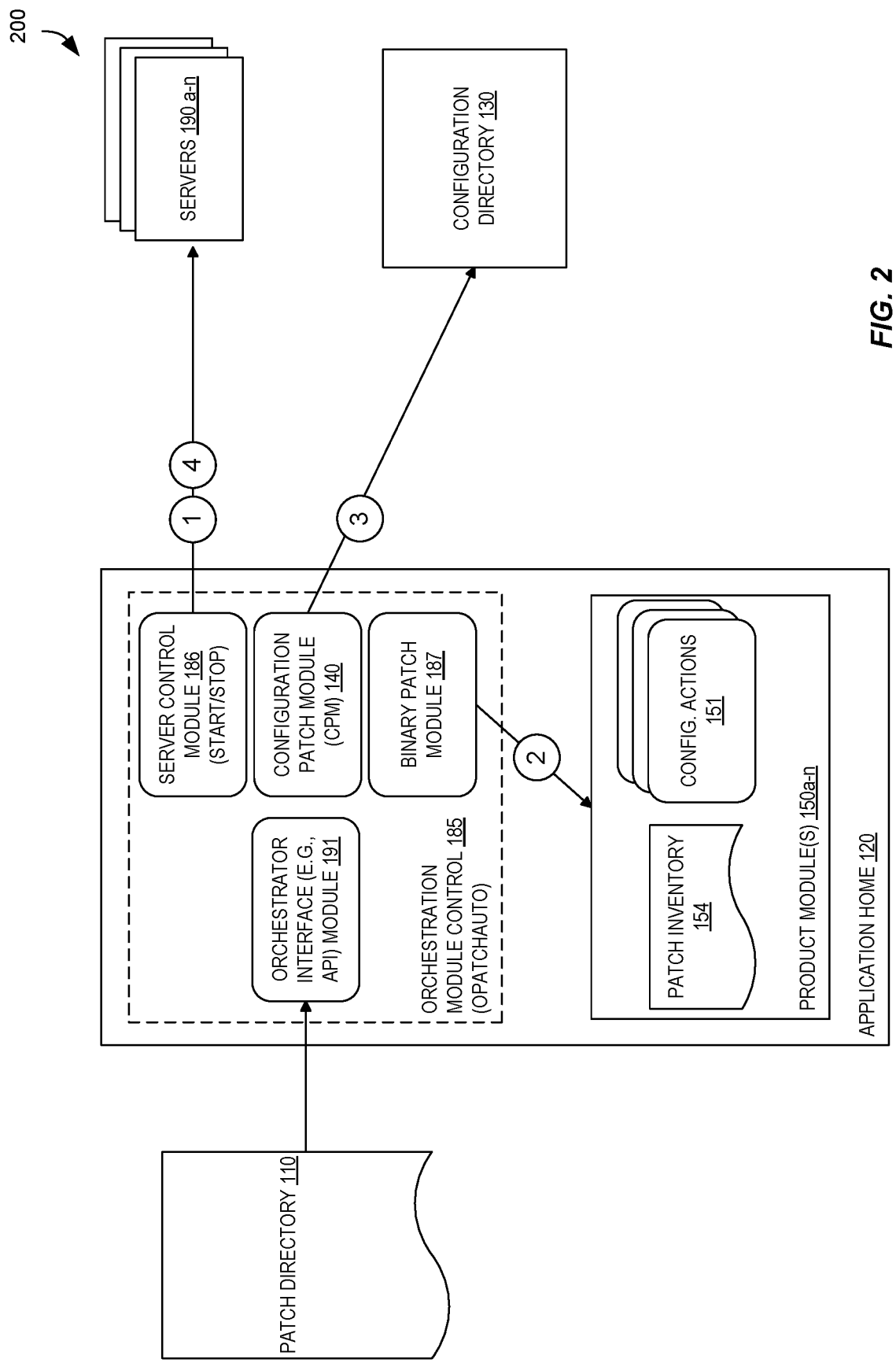
FIG. 2 illustrates a block-diagram of a system including the configuration patch module and a process flow for performing configuration patching according to some embodiments.

A use case is now provided in which four patches are applied to a deployment. FIG. 2 illustrates a block-diagram of a system 200 including the configuration patch module (CPM) 140 and a process flow for performing configuration patching according to some embodiments.

Specifically, FIG. 2 illustrates a block-diagram of the configuration patch module 140 and its interactions during configuration patching according to some embodiments. Additionally, during the discussion of this use case, certain uses of the term "action" may be used somewhat synonymously with the term "step" for ease of understanding. For example, in some scenarios an action may directly correspond to one step, and thus the term "action" may refer to this step. However, an action can also refer to more than one step. Based upon this disclosure and the context of use, those of ordinary skill in the art will be able to discern what is being described. Further detail describing actions and steps is presented later herein.

In FIG. 2, an orchestrator 185 (e.g., an orchestration tool or module, an administrator, etc.) has control of the overall application patching process and the mode selected, and initiates a variety of modules to perform patching in that mode. For example, the orchestrator 185 can initiate an orchestrator interface module 191 (e.g., OPatchAuto), a server control module 186, a binary patch module 187, and a CPM 140. An example of binary patch module 187 can include OPatch (by Oracle Corporation of Redwood Shores, Calif.). For the purpose of this figure, the process is being run in the "full" mode. That is, all actions can be run in the full mode. For example, at circle '1', the orchestrator 185 can utilize a server control module 186 to bring one or more servers 190 down (i.e., stop execution of one or more applications), and then at circle '2' execute the binary patch module 187 to apply the patch binaries stored in, for example, patch inventory 154. After this binary patching phase is complete, the orchestrator 185 can invoke the CPM 140 executable to perform offline configuration patching.

The CPM 140 can, in some embodiments, consume the actions declared by metadata of the set of involved patches at circle '3'. In the exemplary embodiment, three of the four patches have declared actions, and the fourth does not contain any declared action. However, this is merely an example, and the process shown in FIG. 2 can include more or fewer patches and declared actions. The logical actions accomplishing these changes may not be included as part of the patches themselves (unless a patch is delivering new logical actions or updated versions of existing logical actions).

The CPM 140 can then determine any necessary ordering and deduplication of actions among those declared in the three patches.

For example, in some embodiments, the CPM 140, having read in the set of actions of the set of involved patches from patch directory 110, can "bucket" the actions according to a "step group" of their execution. As an example, an action declared to be performed "offline and FIRST" will be put in a separate bucket from another action declared "offline and DEFAULT," which is which are to be run after all actions declared "offline and FIRST".

In some embodiments, the CPM 140 may then perform a deduplication process. For example, all three of the actions may call for a clearing of a particular cache (e.g., an application server cache or "WLS cache"). These duplicated actions can be recognized as being "duplicates" by the CPM 140 (i.e., performing a same task and/or leading to a same result), and the CPM 140 can be configured to "fold" these duplicative actions into a single action. Accordingly, the CPM 140 can streamline a patching process by eliminating unnecessary processing.

Although these processes are described with respect to actions, in some embodiments some or all of these processes are alternatively (and/or additionally) performed with respect to steps. Thus, this description is illustrative and not intended to be limiting. As just one example, the deduplication analysis may execute to with regard to actions, with regard to steps, or both.

The CPM 140 can make any changes that are required by the patches, and any contextual information required by an individual change is fetched via the CPM framework module 144.

In some embodiments, changes marked as important to persist can be executed conditionally, where the CPM framework module 144 can consult/query with the configuration change inventory 133 to see if the changes have already been performed. If the changes have not already been performed then they can be executed. This fact can be recorded to the configuration change inventory 133 by the CPM framework module 144. When done, the framework invocation is complete and the CPM 140 can exit.

The orchestrator 185 can then proceed to start up affected server instances running in, for example, servers 190*a-n* at circle '4'. This process can be repeated to make changes that are marked as to be applied with the server instances online. Further, although the operations can be repeated for online instances (e.g. circle 2 and 3), the process of FIG. 2 can be performed to make changes that are marked as to be applied with the server instances offline and online at a same time. That is, the process of FIG. 2 can be performed a single time for both changes that are marked as to be applied with the server instances offline and online.

In addition to this online and offline patching, in some embodiments the orchestrator 185 can also perform a similar process while the server/application instances in for example, servers 190 *a-n*, are still executing. For example, the orchestrator can cause the CPM 140 to perform patching in "zero-downtime" or "no-downtime" mode—which does not involve any offline patching—while the associated servers/applications are still executing.

Accordingly, a high-level process for performing binary patching and configuration patching may be viewed as including an execution of running analysis steps/tools to gather initial inputs and determine what patching tasks need to occur across machines in the targeted deployment. Then, some form of agent-based execution engine can be run on each host (e.g., OPatchAuto 185), in a well-defined order, to complete the process. For example, the server control module 186 (e.g., Node Manager) can be executed to stop applications/servers 190 *a-n* at circle '1'. The binary patch module 187 (e.g., OPatch) can be executed at circle '2' to check prerequisites, apply binary patches, and verify the results. The configuration patch module 140 can be executed at circle '3' to effect changes to the configuration data. For example, this may result in files within configuration files 134 being modified, or a particular database schema being added within configuration database 135. And again, the server control module 186 can be executed to start the applications/servers 190 *a-n* at circle '4'.

Referring back to FIG. 1, as referenced above, the CPM 140 can serve as an integrator and data broker between multiple actors and repositories, such as an application topology store 160 (and/or other contextual data sources), a credential store 170, a change inventory 133, a logging/auditing provider 132, and/or between the patches themselves (via the ordering and step pruning functions).

In some embodiments where the CPM 140 is initiated by an orchestrator 185, there can be various arguments and properties passed in to the CPM framework module 144. The CPM framework module 144 can report back whether execution completed and whether some or all aspects of the configuration patching were successful. This coordination could take many forms. The simplest form is the orchestrator 185 reading one or more error codes returned by the CPM module 140, and/or consuming the logging/audit data output in a strictly informational way. However in some embodiments, the CPM 140 can return detailed, per-action result information to the orchestrator 185, allowing the orchestrator 185 to be configured to take action (e.g., generate a report or alert, perform a system action, etc.) based upon this fine-grained information.

In some embodiments, the CPM framework module 144 can support both in-process and out of process (OOP) execution models to provide flexibility. For example, in-process execution can allow for increased performance and minimal sharing of data, in particular across process bounds, and can allow the orchestrator 185 to query the configuration change metadata in a rich way, for usage in its inbuilt reporting of planned and executed actions. An OOP model, for example, one in which the CPM framework module 144 can be launched using a command-line tool, can provide an advantage that one can manually invoke the tool in the same way as the orchestrator 185. Thus, in some embodiments the list of steps generated in a patch plan can also, albeit tediously, be completely executable by typing into a command line interface every statement appearing in the plan. This can provide increased benefit for troubleshooting or working around issues with an individual command.

Although certain elements are shown in FIGS. 1 and 2, the systems of FIGS. 1 and 2 can include more or fewer element than that shown in FIGS. 1 and 2 and the arrangement of the elements can be different from that shown in FIGS. 1 and 2.

Configuration Change API

As described above, in some embodiments configuration changes are not included with each patch—instead, a patch can have an associated metadata file (e.g. patch 112) that calls out the changes that need to be made, any invocation requirements (e.g., a class path), a required ordering (local to that patch), and any of those which are to be marked persisted, such that the configuration change inventory should be consulted, and a decision made as to whether they need to be invoked.

The changes themselves can be made within the product's application home (e.g., application home 120), and thus be managed alongside other binary code making up the product. The configuration changes can be placed in a known and stable location, to allow for invocation of changes across products over time. Refer to the use case example above—the "clear cache" change can be provided as a function of the particular application itself, and be available for invocation when executing configuration changes for a patch.

To further align with product code, facilitate product integration, and enable proper review, unit testing, code reuse, and other such quality-fostering processes, configuration changes can be implemented using known languages or formats (e.g., be implemented in Java, Python, C, etc.).

The Configuration Change API or Configuration Action API 142 can thus offer a variety of characteristics. One such characteristic is isolation, in that each configuration change action written to the API 151 can be invoked using its own class loader. This can prevent conflicts between actions; for example, if two of them make use of a particular third-party library, but using different and mutually-incompatible versions.

Another characteristic in some embodiments is unified output. Changes can be forbidden from writing their own log message or other output. All output calls can be made back into utilities provided by the framework, which facade the actual logging mechanism(s). The same goes for status-reporting, which can be accomplished via API contract with the CPM framework module 144.

Configuration Context SPI

Each application/product being patched can require a differing level of richness to this data, depending on both the nature of the product, the variety in deployments of that product, and what its configuration actions require. For example, some products are more "poorly behaved" than others in terms of configuration change needs, and tend to require much more information in order to complete their necessarily more-complex steps.

Accordingly, different products/applications may need to provide this information in a different way. For example, in some environments created using an automated Deployment Tool, a topology store file may be laid down containing a large amount of physical and logical information about that deployment. While patching, some of that information can be made available to any configuration scripts on an as-needed basis. Other products may have this data readily available for use in other forms, wish to introspect such information from the live deployment as a prerequisite step, or not have any mechanism at all and require the manual filling out of a properties file as a prerequisite.

To support one or more (or all) of these possibilities, the Configuration Context SPI or Context SPI 143 can be provided by which an application developer can implement a context provider 152 based on their own needs, which can live alongside the product's configuration action or configuration change action.

In some embodiments, this is occurs using a lowest-common-denominator form, by which the data exchange among {framework, configuration change, context provider} can be in the form of property names and values. The provider is responsible for translating from the native context information, assuming that is anything richer than property values itself, into this simpler form when returning values. It is possible that richer information could be passed through the framework as an opaque type, as that is going from a provider created by a product team to actions implemented by the same team. However, that may have consequences on the ability to reuse actions across products and should be avoided.

In some embodiments, there may be provided a registry of such properties, and as with change invocation, context can be obtained and used across products.

Configuration Security SPI

Similar to as described above with regard to configuration context, security information may also be utilized during configuration patching, such as credentials, keys, certificates, and so on. Therefore, a Configuration Security SPI or a Configuration Credential SPI 145 can be provided. Given that repositories for such data is often different in different contexts, and the usage model can be different, this can be defined as a separate credential provider 153, with due attention paid in implementation to its use for sensitive data.

CPM Flexibility

To accommodate various operating environments, a variety of configurations and uses of the CPM 140 may be utilized.

In some embodiments, the CPM 140 is typically invoked twice for each targeted deployment; once for the "offline" phase, when the targeted product's server instances are still down, and once for the "online" phase, after server instances have been brought back up. In some embodiments, though, the CPM 140 may also be invoked during a "pre-offline" phase, "pre-patch" phase, "post-online" phase, or "post-patch" phase.

The CPM 140 can aggregate configuration actions from all patches provided, reorder and de-duplicate those as appropriate, and execute them. Actions that are deemed "persistent" can cause a check to be made against the change inventory, and executed when they have not been previously executed. Other actions can be executed unconditionally. Fatal errors in a given action may cause execution of all actions to stop. If there are no fatal errors, execution will complete either successfully, or with warnings.

The CPM 140 can be installed in each application home 120, and may be local to a machine and used by server instance(s) on that machine, or shared among instances running on many machines.

The CPM 140 can receive a configuration directory passed to it on its invocation. This may be the illustrated "configuration directory" 130 (or DOMAIN_HOME) or even another location (e.g., an "INSTANCE_HOME" of a software application instance). This configuration directory also may be local to a machine and used by server instance(s) on that machine, or shared among instances running on many machines. If the application makes use of a configuration database 135, its location and other elements (such as credentials) used to access it may also be passed to the CPM 140 on its invocation, or alternately the same may be made available to the CPM referentially via the contents of a configuration file known to the CPM within the configuration directory, or by contract via the implemented context provider 152 and credential provider 153 implemented for the application.

In some embodiments, the runtime data and outputs of the CPM 140, possibly including logs, can be written to a specified directory under the specified configuration directory. Configuration actions 151 may write to the configuration directory and configuration database as required by the owning product.

The CPM 140, in some embodiments, may have the specific application home (e.g., "ORACLE_HOME") identifier be passed to it on invocation. The CPM tool may then, for a single invocation, apply configuration changes to a single product, whose patches are bound to a single application home. This may keep CPM logic simplified, and allow an orchestration tool to invokes CPM 140 repeatedly, when and where necessary, to complete a patching process for a larger deployment.

In some embodiments, no files within the CPM installation or the targeted application home are written to by the CPM tool itself. Instead, in such embodiments, the application home may be written to by configuration actions that the CPM tool invokes.

Illustrative CPM Commands

The CPM 140 may provide commands (e.g., invokable through an API) to allow for an orchestrator to performing various configuration patching actions.

I. Analyze

Given the location(s) of the application's configuration data and a directory containing patches, this command produces an execution plan showing what actions will be prospectively taken, subject (for persistent steps) to consultation with the change inventory, and any runtime discovery by the actions themselves. This portion of the CPM logic can be executable separately (from any actual patching) for several reasons:

(1) It can ensure that the declarations within each patch are well-formed and can be properly consumed by the CPM tool.

(2) It can perform the aggregation, ordering and deduplication process, which ensure that the overall plan generation for the presented set of patches is completed properly without error.

(3) It can present the results for manual review by the administrator, to provide confidence of correctness before proceeding with downtime and binary/configuration patching.

(4) It can present the results for consumption by the invoking orchestration tooling, if any is present.

For example, it may be desired to include information regarding the actions to be executed in the patch plan for the overall patching session.

This can include a list of the subset of patches provided that contain configuration actions, and can include a "friendly" name of the persistent actions that may be conditionally run when the plan is executed.

The analyze command can, in some embodiments, utilize arguments such as a configuration directory (e.g., "configdir" pointing to an instance home), a location of a configuration database, an application home, a patch directory, a phase indicator (e.g., "phase" being online or offline), etc.

II. Prereq

A prereq command can be provided to instruct the CPM 140 to perform all of the same tasks as the "analyze" command above, and then additionally proceed to execute prerequisite checks. These checks can be structural checks and/or prerequisite/test checks, where all steps in a generated execution plan are executed in a test or preview way. For example, each action listed is invoked in this manner, such that any in-code prerequisite steps are evaluated and a result returned. The change inventory can be consulted as needed, and output provided, showing whether action(s) which perform that persistent configuration action would be run, and whether actions which declare persistent action(s) as prerequisites would be run. This can be done without touching anything in the deployment and executed while all servers are up, before patching begins. Test invocation can be performed for all phases.

In some embodiments, the prereq checks do not check for anything which may itself be provided by a patch that will be executed at the same time, and/or do not check that something laid down by its own binary patch is in place (as that has not happened yet). In some embodiments, the prereq checks do not have any side-effects on any running server/application by nature of its having been run. Accordingly, prerequisites are more of the form "check some configuration element to make sure it's within a valid range", "check the data sources to make sure they are all up and running", etc.

The prereq command can, in some embodiments, utilize arguments such as a configuration directory (e.g., a "configdir" pointing to an instance home), location of a configuration database, an application home directory, a patch directory, a phase indicator (e.g., "phase" being online or offline), etc.

III. Apply

The apply command can first perform the same tasks as the analyze command, and/or can execute all prerequisite checks run by prereq and execute all steps for the phase provided.

The prereq command can, in some embodiments, utilize arguments such as a configuration directory (e.g., a "configdir" pointing to an instance home), location of a configuration database, an application home directory, a patch directory, a phase indicator (e.g., "phase" being online or offline), etc.

IV. Retry

In some embodiments utilizing a stateful session configuration patching approach, the retry command can be used in the case that execution has halted, due to an action having failed. In such a case, CPM 140 may halt execution with an error, and await manual diagnosis and resolution of the issue. In some cases, resolution can be quite straightforward, for example if a server of a dependent product, which the action attempted to contact, has not yet been brought back up. Assuming this is done, running CPM 140 with the retry command can allow execution to pick up seamlessly from the failed action, by rerunning it and then proceeding with others.

V. Abort

In some embodiments utilizing a stateful session configuration patching approach, the abort command can be used to terminate a session at the current point in its execution; for example, if analysis has been done but no actions have yet been executed, if offline execution has completed but online has not, or if execution has halted due to an action having failed, and resolution/retrying that action has not been successful. This command can clear out all state, such that the next tool invocation, regardless of command, will be "fresh."

VI. Version

The version command can print/display/provide the version of the CPM tool, suitable for machine consumption. This can be used for quick checks by an administrator/orchestrator, whether manually or via scripting, that the expected version of CPM 140 is present.

VII. Inventoryadd

The inventoryadd command can be utilized to manually add an entry to the configuration change inventory. In normal patching operation, neither this nor the subsequent inventoryremove commands may ever be required; however, these can be used in some embodiments/scenarios where particular problems can arise. To give two examples:

First, an action included with a patch might have been flawed, such that the correct changes were made, but the configuration change inventory entry was not properly declared (missing, present but wrong name) and so was not added. Adding the entry manually will allow any actions accompanying future patches with this as prerequisite to execute.

An action was accomplished outside of CPM 140 visibility, for example if a new application instance is created using patched binaries, the needed configuration "changes" might be present from the start. Again, a future patch may include an action dependent on those changes, and it will check for the inventory entry before executing.

The inventoryadd command can, in some embodiments, utilize arguments such as a configuration directory (e.g., a "configdir" pointing to an instance home), a key (e.g., "key" of "oracle.idm.oam.ConnectionPoolv2"), a comparator (e.g., "comparator" of "exactmatch", etc.), an action identifier (e.g., "actionid" of "eb629 . . . "), a patch identifier (e.g., "patchid" of "1234"), etc.

VII. Inventoryremove

The inventoryremove command can manually remove an entry from the configuration change inventory. Examples which may use this include situations where an action included with a patch was flawed, such that incorrect changes were made, but the action was declared successful and the inventory entry was added. Thus, the entry needs to be removed such that on application of the corrected patch, the proper changes will be executed (overwriting the broken ones). Another example situation may include where a patch and its included actions were correct, but the user-visible effect of the patch has been judged not desirable, the binary patch rolled back, and the affected configuration (e.g., a change to a database table) is restored from a backup taken before applying. Accordingly, the inventory entry can be removed to align with the current contents of the deployment and to allow the patch to be re-applied later, if desired.

The inventoryremove command can, in some embodiments, utilize arguments such as a configuration directory, a key (e.g., "key" of "oracle.idm.oam.ConnectionPoolv2"), etc.

IX. Inventoryquery

In some embodiments, the inventoryquery command can be used for diagnostic purposes to assess whether a given inventory entry or to view all such entries. The inventoryquery command can provide this functionality. If, for example, a key (or patchid or actionid) is provided as an option/argument, the command can output whether an entry for that key (or patchid or actionid) is present, and if present, can present the contents of the entry.

In some embodiments, one of these three options is provided on a given invocation. If none of these three options are provided, a listing of all inventory entries can be output.

The inventoryquery command can, in some embodiments, utilize arguments such as a configuration directory, a key (e.g., "key" of "oracle.idm.oam.ConnectionPoolv2"), an action identifier (e.g., "actionid" of "eb629 . . . "), a patch identifier (e.g., "patchid" of "1234"), etc.

FIG. 3 illustrates an example of metadata 300 for configuration patching according to some embodiments. The example metadata 300 can be, for example, fragments of metadata. The metadata 300 shown in FIG. 3 can also be called configuration metadata, configuration patch metadata or application patch metadata. The metadata 300 can be, for example, in an XML file. Such an XML file can exist in patches for which a configuration patch may be required. As shown in FIG. 3, the configuration patch metadata can include an action ID 310, a type 315, a category 320, an order 325 and a failure mode 330, among other information.

Name 317 can be the physical action (i.e., the code) that will be executed. It will then be determined whether the code identified in name 317 can be run. The action ID 310 can be a universally unique identifier (UUID) of a particular action. Actions can be a mix of types, categories and orderings. The type 315 can identify the invocation model. The category 320 can identify when and where (e.g., the phase) in a patching flow a given subset of actions will be run. For example, whether an action is should be performed while the server is in an offline phase, an online phase or no downtime phase. The order 325 can identify in what order (e.g., first, last, default) within a category (e.g., online, offline, no downtime) the action should be performed. Therefore, order 325 can identify a specific ordering within a general category 320. A failure mode 330 can identify how the CPM 140 should respond in the event the action fails in its execution. For example, overall execution can be stopped or a warning can be given; in this way actions can be declared with differing levels of rigor in terms of verification they have succeeded before proceeding to run other actions.

As shown in FIG. 3, a single idempotent action is declared. The single action, identified by, for example, "action id" has a prerequisite inventory entry (e.g., "prereqInventoryEntryReference") which may have been set by an action in a previous run, and the action in the previous run declares itself with an entry written on success to be used by some other action in a future run. Further, the features to be enabled, which is the purpose of FeatureEnablingAction, are input via parameters (e.g., "parameter"). In the example shown in FIG. 3, a determination that other actions must be run before a particular action, that is, the inventory must be checked, can occur using, for example "prereqInventoryEntryReference." If a completed action must be recorded in inventory, it can be recorded using, for example "inventoryEntryReference."

Flows

FIGS. 4, 5, 6 7 and 8 illustrate exemplary flows in accord with some embodiments. The operations of these flows is described with reference to the exemplary embodiments of the other diagrams, such as FIG. 1 and/or FIG. 2. However, it should be understood that the operations of these flow diagrams can be performed by embodiments other than those discussed with reference to these other diagrams, and the embodiments discussed with reference to these other diagrams can perform operations different than those discussed with reference to the flow diagrams. Also, though the flow diagrams in these figures show a particular order of operations performed by certain embodiments, it should be understood that such order is exemplary. Thus, it is expressly stated that other embodiments can perform the operations in a different order, combine certain operations, overlap certain operations, etc.

Figure 4:
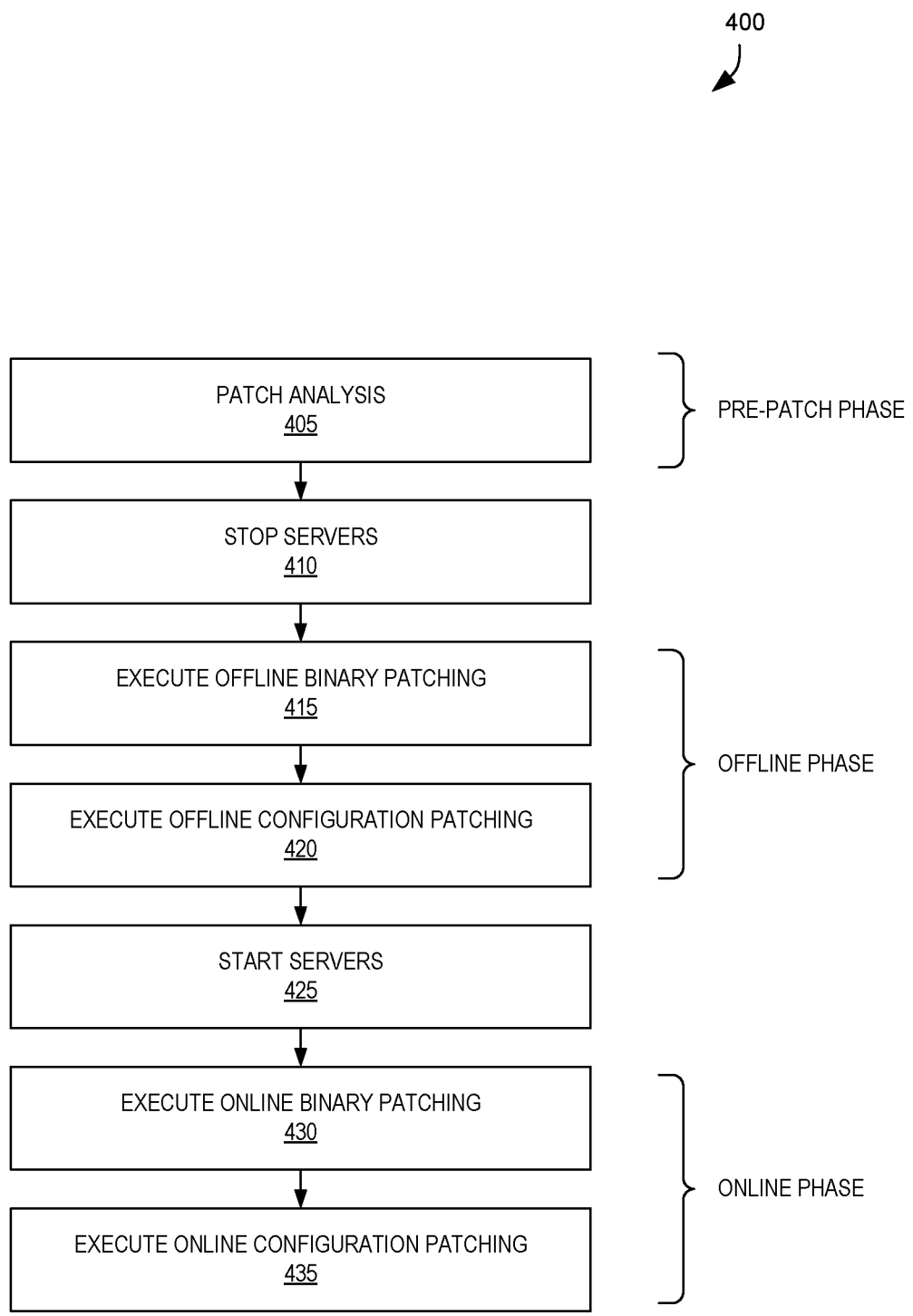
FIG. 4 illustrates an exemplary flow for an overall binary and configuration patching process according to some embodiments.

FIG. 4 illustrates an exemplary flow for an overall binary and configuration patching process according to some embodiments. As described earlier herein, an overall binary and configuration patching process may include multiple operations involving multiple actors. Accordingly, FIG. 4 illustrates just one possible scenario. Specifically, in FIG. 4, the binary and configuration patching are performed separately for, for example, an online phase and an offline phase. However, exemplary embodiments are not limited to performing the binary and configuring patching process in particular phases. For example, the binary and configuration patching can be performed in a single instance as described in FIG. 8, and not based on the phases.

At block 405, the flow 400 includes a pre-patch stage involving performing patch analysis—for binary patches and associated configuration patches, if existing. This patch analysis can include receipt of an "analyze" command (as described earlier herein) and the associated processing, as performed by (or under the control of) the CPM 140.

The flow 400 also includes block 410, in which the involved application/servers are stopped.

An offline patching phase begins, where the flow 400 includes block 415, in which offline binary patching occurs, and block 420, in which offline configuration patching occurs.

At the end of the offline patching phase, the flow 400 also includes block 425, in which the servers/applications are started, and an online patching phase begins.

Thus, the flow 400 also includes block 430, in which online binary patching occurs, and block 435, in which online configuration patching occurs.

Further, although FIG. 4 illustrates that binary patching is performed before configuration patching, configuration patching may be performed before binary patching. Further, configuration patching may be performed without performing binary patching. That is, configuration patching can be performed without doing binary patching. Also, an online phase may be performed before an offline phase. In addition, the steps can be modified based on when the servers are stopped and started.

Figure 5:
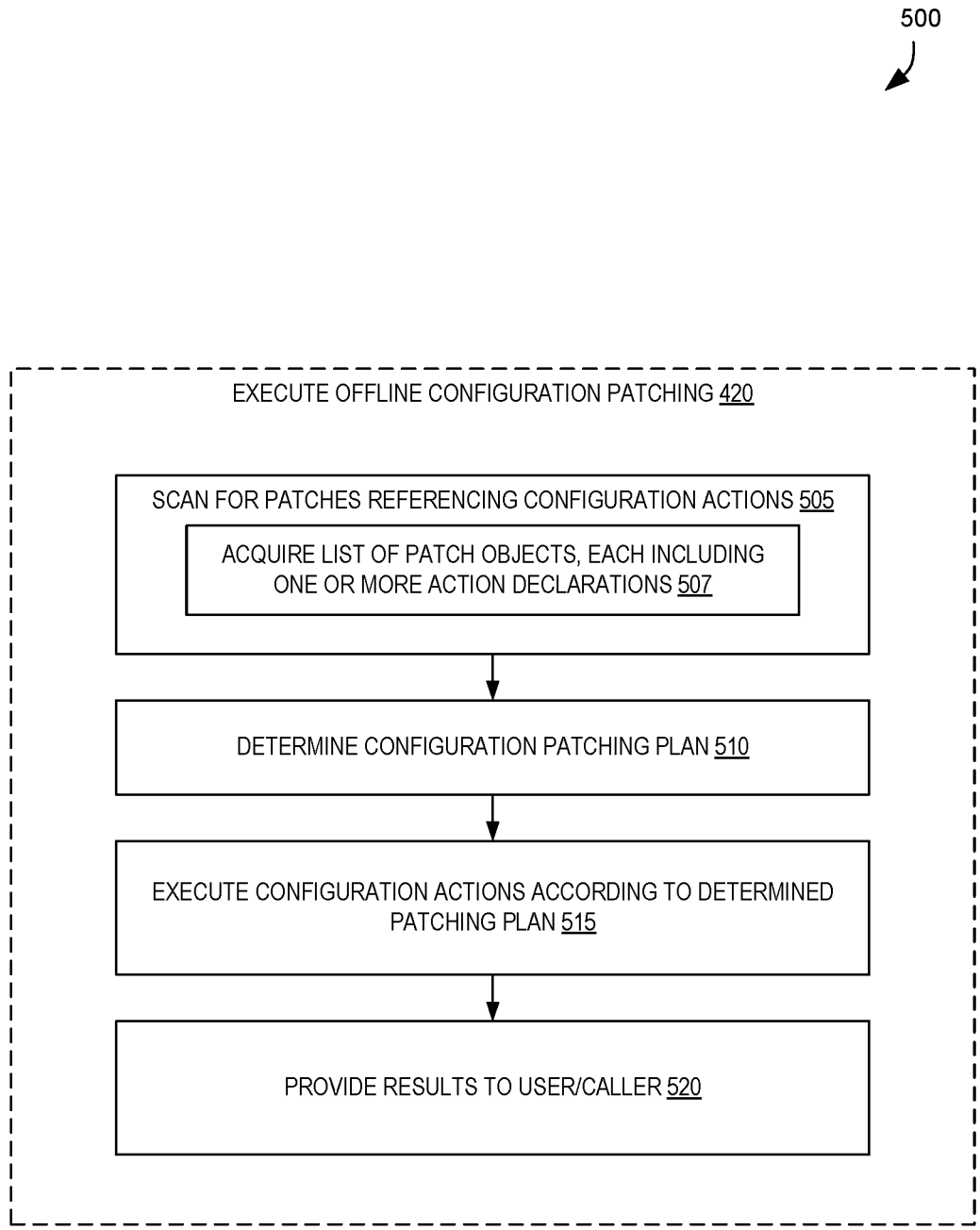
FIG. 5 illustrates an exemplary flow for configuration patching according to some embodiments.

FIG. 5 illustrates an exemplary flow for configuration patching according to some embodiments. Some or all of the operations of flow 500 of FIG. 5 may be performed by the CPM 140, and may occur in response to a receipt of an "apply" command as described above.

In some embodiments, the operations of flow 500 are performed within block 420 of FIG. 4, in which offline configuration patching occurs. Of course, these operations may occur at other times (such as at block 435 of FIG. 4) and in different flows.

The operations of flow 500 can be broken up into at several discrete stages. The first stage includes block 505, in which a scan for patches with corresponding metadata declarations referencing configuration actions occurs—i.e., an analysis of the provided patches occurs. In some embodiments, block 505 includes block 507, and can includes acquiring a list of patch objects that each include one or more action declarations.

(1) Analysis of the Patches Provided

In this portion of patch analysis, each patch in the provided directory can be examined. In some embodiments, this block 505 includes determining whether a configuration metadata file for the patch is present. If not, the flow continues to proceed to examining the next patch.

In some embodiments, block 505 includes determining whether any patch metadata declarations included as files within the provided patches is valid, well-formed, and/or compatible with the particular version of the CPM 140. In some embodiments, block 505 includes determining whether the patch metadata declarations provided as files alongside the set of provided patches are similarly valid, well-formed, applicable to the set of provided patches, and/or compatible with the version of the CPM 140. In some other embodiments, block 505 includes determining whether the patch metadata declarations obtained via a network request of an online service or API are similarly valid, well-formed, applicable to the set of provided patches, and/or compatible with the version of the CPM 140. If the answer (e.g., to any of these) is a "no", then the patch may be corrupt or the CPM 140 may have been asked to do something incorrect. In some embodiments, the CPM 140 can exit execution with an error code/message.

If it's OK to proceed, then all actions listed (or otherwise identified) in the file can be read in and saved in memory for later consumption in plan generation. In some embodiments, then, a list of patch objects is generated (i.e., block 507), where each patch object includes one or more action declarations for actions that are to be performed.

(2) Generation of Configuration Patching Plan

Figure 6:
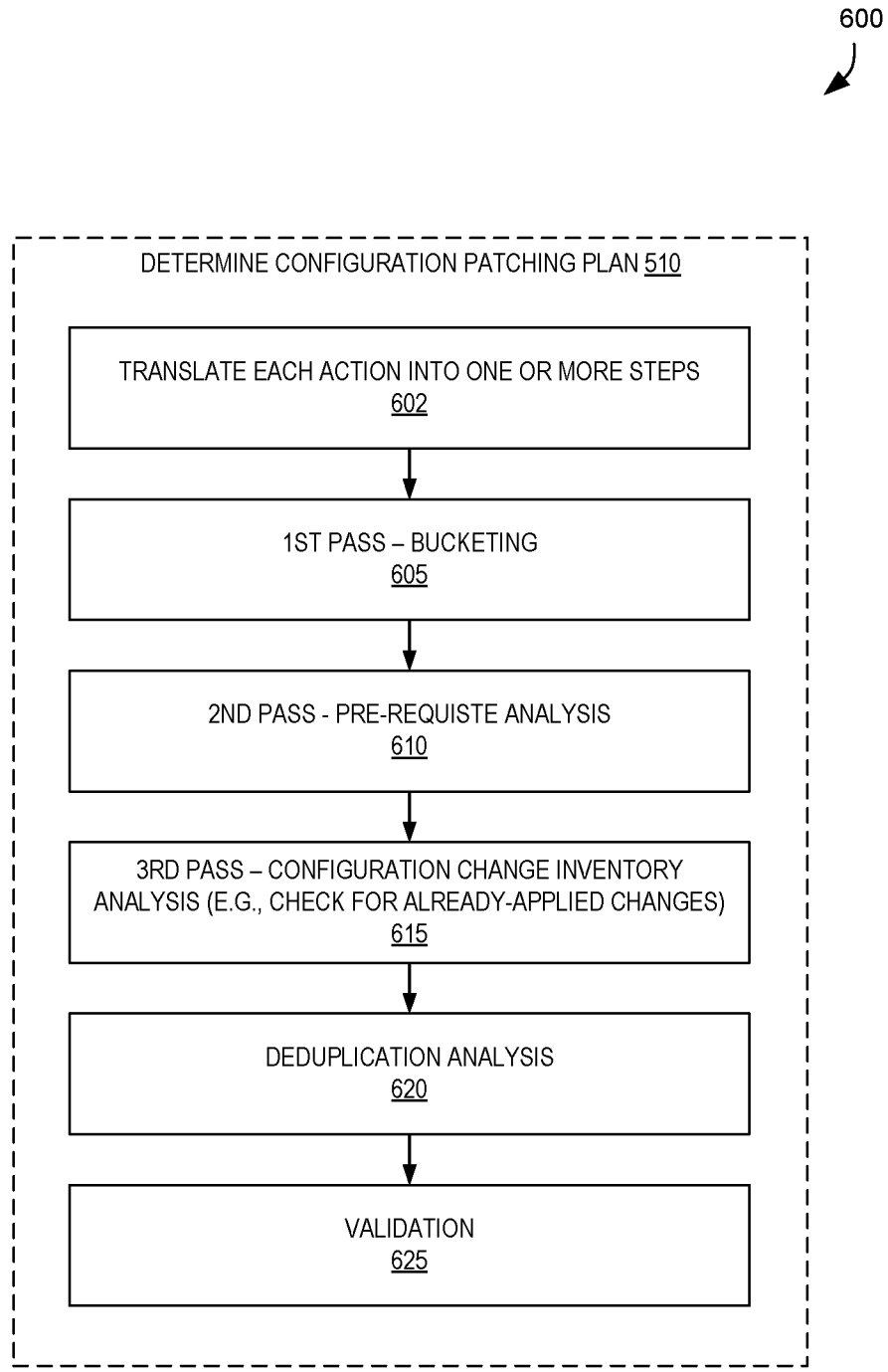
FIG. 6 illustrates an exemplary flow for determining a configuration patching plan according to some embodiments.

Flow 500 may then continue with block 510, where a configuration patching plan is determined. FIG. 6 illustrates an exemplary flow for determining a configuration patching plan according to some embodiments. The blocks of FIG. 6 may occur as part of block 510 of FIG. 5, and can be performed by the CPM 140 in some embodiments.

As described above, in an embodiment, it can be assumed that all configuration metadata has been read in and is available in memory for the generation code to consume.

In plan generation (e.g., determine configuration patching plan 510), the read-in patch metadata can be categorized, translated, and processed, yielding a final plan for execution. To start the generation, in some embodiments, the set of actions are translated into a set of steps, in block 602.

In some embodiments, each action may not be an atomic element that can be executed directly. Thus, in these embodiments, it's not a simple one-to-one (or "1-1") mapping between an action provided in a patch and a "step" that will be executed. Instead, in some embodiments, an action can be mapped to many different steps (i.e., is "1-many").

For example, assume a single patch "123" (i.e., patch ID is 123), which declares a single action:

```
<action id="af03c3b2-d6f8-410e-960b-0d670a895a46">
    <name>oracle.configpatch.actions.builtin.AddFeatureZToConfigXML</name>
    <prereqInventoryEntryReference >
       <inventoryType> RECORDED_ACTIONS </inventoryType>
       <key>oracle.idm.oam.FeatureXDomainWiring</key>
    </ prereqInventoryEntryReference >
    <prereqInventoryEntryReference >
       <inventoryType> RECORDED_ACTIONS </inventoryType>
       <key>oracle.idm.oam.FeatureYDomainWiring</key>
    </ prereqInventoryEntryReference >
    <inventoryEntryReference >
       <inventoryType> RECORDED_ACTIONS </inventoryType>
       <key>oracle.idm.oam.FeatureZDomainWiring</key>
    </ inventoryEntryReference >
</action>
```

In order to accomplish this configuration change, the CPM 140 may need to actually perform a variety of steps, including:

(1) Checking whether patch 123 has actually been applied. The class to be called may be newly-introduced or updated with this patch itself.

(2) Checking whether the prerequisite configuration change "oracle.idm.oam.FeatureXDomainWiring" has been performed (e.g., exists in the change inventory_.

(3) Checking whether the prerequisite configuration change "oracle.idm.oam.FeatureYDomainWiring" has been performed (e.g., exists in the change inventory).

(4) Executing the configuration action "oracle.configpatch.actions.builtin.AddFeatureZToConfigXML" itself (5) Adding a new change inventory entry for "oracle.idm.oam.FeatureZDomainWiring."

In an embodiment, a second action can be added to the patch. Handling the second action will thus likely involve the addition of at least one step (execute the action itself), but perhaps more, such as if that action also declares that an inventory entry be recorded for it, or if it has inventory prerequisites (separate from the first action), for example.

For further illustration, consider a scenario where a second patch with a single action is also provided. That will require at least two steps be added (check that the second patch is present; execute the included action). Additionally, perhaps more steps will further be required, depending on the action declaration.

Configuration plan generation, therefore, can be thought of as involving the translation of "public" Configuration Action API declarations into a larger set of execution steps that are private to the CPM 140, but used in order to satisfy that API safely and consistently.

Thus, there can be a variety of step types implemented as part of the CPM 140, and possibly one of which will drive the public API. In some embodiments, the generation process can decompose the declared actions into the set of step invocations necessary in order to accomplish those. Through the remainder of flow 600, a reference from each step to the ID of the corresponding metadata action from which the step was generated can be retained and used both in processing and can also appear in the generated plan as a diagnostic aid. Similarly, the ID of the patch whose metadata included the action declaration can be retained for the same purposes.

With the set of steps, flow continues to block 605 for a "first pass" where the steps can be aggregated and categorized—all steps from all patches are "bucketed" by the step group of their execution. This bucketing, in some embodiments, can refer to using a combination of action elements (e.g., the action category and order elements) to segregate the steps into different groups.

As an example, a step for an action declared to be "offline and FIRST" can be put in a separate step group from a step for an action declared "offline and DEFAULT".

In some embodiments, some steps for actions declared as belonging to a category other than that what is currently requested can be filtered away at this point. For example, if CPM 140 is invoked with "analyze" (in phase=offline), then a step declared as "online and FIRST" need not be considered at all and can be discarded (because it is an online phase action, not an offline phase action).

At this point, there are data structures holding all of the steps to be executed, categorized by the step group in which they will ultimately be executed.

At block 610, a second pass referred to as pre-requisite analysis can occur. In this block, any declared (or determined) pre-requisites can be determined and used to re-order the steps, if necessary. For example, an action may be configured to declare that it is a persisted action and/or what the action depends upon. Thus, in some embodiments, if a first action requires that a second action occur first (e.g., the first action depends upon "thing1" and the second action provides "thing1" as a persisted action, to be recorded to the change inventory), then the step(s) of the second action can be moved ahead of the steps(s) for first action in the plan.

As another example, consider a scenario where Patch 123 includes an action declaring "some.Action1", and Patch 456 has "some.Action1" declared as a prerequisite. In this scenario, it is useful to ensure that steps(s) for Patch 123 are placed ahead of step(s) for Patch 456 in the execution plan; otherwise, Patch 456 cannot execute.

Additionally, block 610 can be configured to detect unresolvable dependency issues (e.g., two patches both depend upon the other patch being executed first) and, as a result, terminate and/or generate an error message or warning, or perhaps violate the stated dependencies to provide a logically correct ordering of steps in the same group that provide changes tracked by an inventory entry, and other steps that have those as prerequisite.

At block 615, a third pass may be performed as a "configuration change inventory analysis" in which a check is made to detect any already-applied changes. This block 515 can include examining (or querying against) the configuration change inventory to determine whether a particular action (or step, etc.) has already been applied; if so, the action (or all actions of a patch, or all steps for the action(s) of the patch, etc.) can be eliminated from the set of steps. In some embodiments, an action/step that is determined to have been already performed (i.e., has an entry in the configuration change inventory) may be removed from the set of steps.

At block 620, a deduplication analysis can be performed. In some embodiments, block 520 includes removing unnecessary steps that would have been unnecessarily performed multiple times if not so pruned.

In some embodiments, each action can be declared with (e.g., have an action declaration with) a "DEDUPLICATION_ELIGIBLE" hint indicating that the action, perhaps, need not strictly be performed at the particular time within a patch, as long as it does occur at some other point in time.

Before keeping one or more steps for a given action with this "deduplication eligible" hint set in the plan, it needs to be determined if steps have already been added into the plan for an "identical" action. If so, the action can be skipped, and no steps generated kept in the plan for it. In some embodiments, this occurs in a deterministic manner as discussed later herein.

In some cases, deduplication could result in a patch containing no actions (and thus, no steps). For example, assuming that two patches 1 and 2 exist, where each contains a single action, marked DEDUPLICATION_ELIGIBLE. In some embodiments, if selecting the action from patch2, the action from patch 1 may be discarded. However, this results with no actions being performed in patch 1 at all, and thus no steps will be performed/generated for patch 1 in some embodiments (though in some embodiments, steps to check for patch 1 in the binary patch inventory may exist). In some embodiments, though, patch 1 will still be recorded as being applied (or otherwise "falsely" reported as being performed), but in some embodiments the action from each patch may be preserved (i.e., not removed). For example, even though an action/step may not be necessary from a "safety of execution" perspective, the action/step may still occur for user experience reasons—as step-minimization processes can be a "black box" from the perspective of an administrator/orchestrator/end user, it is possible that some users may consider it a bug if they provide patches that they know have corresponding metadata (i.e., actions) yet those patches do not exist in the generated plan.

The similar may occur for the case where a patch 1 contains solely an action tied to an inventory entry, but during analysis the CPM 140 determines, from the change inventory, that the change has already been performed (e.g., see block 615). Again, although nothing needs to be done for this patch, the action/step(s) may be maintained, "falsely" reported, and/or converted into a "verify" action (i.e., determine, again, that the change has already been performed) to ensure that it appears that patch 1 has successfully been processed.

In some embodiments, actions/step(s) may be viewed as duplicates except for minor differences, such as different "failure modes." For example, some actions/step(s) coming from two or more patches may be duplicates, per a definition based upon the metadata schema (e.g., a same type, name, and order) but have different failureMode values.

In some embodiments, these multiple "equivalent-but" actions/step(s) can be consolidated into one action/step, and that one action/step may have the "most severe" failure Mode (of the particular stated failure modes) associated therewith. For example, consider a scenario with patches 1, 2, and 3, where each contains a single action, marked DEDUPLICATION_ELIGIBLE. These actions are "the same" by a configured "equivalency" definition, except that 1's action uses a failure mode of WARNING, 2 uses STOP, and 3 uses CONTINUE. In some embodiments, a single action will appear in the plan to express all three, and the failure mode will be STOP (which is more "severe" than WARNING or CONTINUE). It is more "severe" in that it prescribes the greatest rigor in verifying execution success among the three values.

At block 625, a validation process may be performed. The validation process may comprise examining all resulting ordered actions/steps and determining that they still do not violate any stipulated requirements (e.g., pre-requisite ordering, etc.) The validation process can, in some embodiments, include causing this plan to be presented to a human operator for confirmation/diagnosis, etc. Once done, there are data structures holding all steps that the plan may include.

In some embodiments these steps are processed in order to assemble the finalized set of steps to form the execution plan. This execution plan can be written out to disk. In processing, each step is examined and it is determined whether that needs to appear in the plan at all and, if it does, the proper ordering for it relative to other steps in its step group. All steps of each step group similarly are ordered relative to other groups with steps appearing in the generated plan.

At this point generation can be complete. If the CPM 140 invocation dictates that some or all steps immediately be executed (e.g., the command used was prereq or apply, not analyze), then it will proceed to do that, as described by the execution plan.

In some embodiments, the determination of the configuration patching plan 510 in flow 600 is deterministic. Thus, in these embodiments, if a deployment, with a given configuration change inventory, is provided a set of patches and corresponding metadata, a plan is created—and if that plan is not executed, as that may affect the inventory, and the same inputs are provided again, the same plan may be generated again. Accordingly, with two deployments which are identical in preconditions—same binary contents, same inventories—and plans are generated against both, those will be identical.

Accordingly, deterministic generation can help ensure consistency among a large set of deployments (less variance in the logic being run and the order of that logic will help ensure successful execution), but moreover ensure reproducibility when problems are observed in applying a set of configuration changes to a given deployment. Bugs which are not consistently reproducible are much harder bugs to fix.

Thus, in some embodiments this determination of the configuration patching plan 510 is made deterministic by having any ordering among steps which are equivalent, in that logically there is no issue with running either before the other, is predetermined through an algorithm and not left to chance. For example, if a list holds all actions with an order of FIRST, just copying those into the plan as they appear in the list may or may not be sufficient, depending on how that list was assembled.

In some embodiments, any ordering among steps which are equivalent, but coming from multiple patches, are similarly predetermined through an algorithm. Also, in some embodiments, the de-duplication of steps from multiple patches which are determined to be identical, deciding which steps will appear within the generated plan, similarly happen in a deterministic way.

Certain embodiments utilize a CPM 140 that is configured to use one or more of the following guidelines in processing:

In some embodiments, steps from patches are processed in order of ascending patch ID. For example, if there are patches 123 and 456, and both have steps belonging to step group A, steps from 123 are processed first, and then 456. When done, steps from group B will be examined next, again starting with 123 and then 456.

In some embodiments, steps that are duplicated among multiple patches, such that any of them will accomplish a task, the one from the highest patch ID containing such a step is included and the rest excluded. For example, if at a given point a step can be chosen from patch 123 or the same one from patch 456, then the step from the patch with the higher ID (456) is used.

In some embodiments, both of the above techniques are utilized, and result in the generated plan containing unique steps (within each step group) ordered from the lowest to highest patch ID, and will contain duplicated steps referencing the latest patch ID containing those only.

In some embodiments, the plan generated during processing is "optimal" such that unneeded/duplicate steps are not present, as those steps add clutter and waste execution time. In some embodiments, new steps created for a given action are not themselves be duplicates of other steps. Going back to the examples in the previous section, if provided one patch with two actions, on processing the first action a step will be generated to check that the patch has been applied, and on processing the second action, another step to perform the same check is not required and is not be generated.

In some embodiments, "step equivalence" can be configured flexibly. For example, at the step level, two steps may be configured to mean "the same" if and only if (IFF) they are of the same type, have the same failure mode, and contain identical parameters. Of course, other definitions may be flexibly used in various embodiments.

In some embodiments, each step generated can be properly annotated with the approach to be taken in case the step fails.

Referring back to FIG. 5, which further includes block 515 where the configuration patches are executed according to the determined patching plan determined in block 510, and the results can be provided back to the user/caller at block 520.

For ease of understanding, an exemplary Execution Plan File Format will be described. In some embodiments, the file format is defined using XSD. As shown below, the primary element type is that of a "Step." Step groups are not exposed as discrete elements, but through the numbering of the individual steps. This provides significant execution flexibility to handle future needs, without necessitating any schema changes.

The "parameter" (or argument) is also a useful type, as parameters are the data transfer mechanism by which needed inputs are provided to a Step, regardless of the type of the step or what it needed. This again provides flexibility; if a new type of step needs to be implemented, the schema does not need to change, but instead a new StepExecutor with different Parameter requirements is defined.

```
<xs:schema version="1.0" xmlns:xs="http://www.w3.org/2001/XMLSchema">
    <!-- Top-level element. -->
    <xs:element name="executionPlan" type="ExecutionPlan"/>
    <xs:complexType name="ExecutionPlan">
        <xs:sequence>
            <!-- Schema version. -->
            <xs:element name="schemaVersion" type="xs:string"/>
            <!-- The LCM operation to be performed by this plan. -->
            <xs:element name="operation" type="xs:string"/>
            <!-- Overall status of execution. This is derived from the results for
                the individual steps run. If execution has not yet started, this is
                PENDING. -->
            <xs:element name="status" type="xs:string"/>
            <!-- Reason code for the returned status.
                Not required if the present status does not require an accompanying
                code. -->
            <xs:element minOccurs="0" name="reasonCode" type="xs:string"/>
            <!-- Key/value pairs holding data applicable to this plan.
                All plans created for a given operation probably will have some
                params in common. Others will be specific to a given plan. -->
            <xs:element minOccurs="0" maxOccurs="unbounded" name="parameter"
type="Parameter"/>
            <!-- List of steps to be executed. -->
            <xs:element minOccurs="0" maxOccurs="unbounded" name="step" type="Step"/>
        </xs:sequence>
        <!-- UUID. Format is usual Java-generated UUID.
```

```
            ex: output of "UUID.randomUUID( ).toString( )" -->
    <xs:attribute use="required" name="id" type="xs:string"/>
    <!-- Time this plan was generated. Format is ISO 8601, UTC timezone.
            ex: new SimpleDateFormat("yyyyMMddHHmmss'Z'"); -->
    <xs:attribute use="required" name="creationTime" type="xs:string"/>
    <!-- Time this plan was last modified. Format same as creationTime. -->
    <xs:attribute use="required" name="modificationTime" type="xs:string"/>
</xs:complexType>
<xs:complexType name="Step">
    <xs:sequence>
        <!-- Step number within the overall plan -->
        <xs:element name="number" type="xs:string"/>
        <!-- Returned status. If execution has not yet started, this is PENDING. -->
        <xs:element name="status" type="xs:string"/>
        <!-- Reason code for the returned status.
             Not required if execution has not yet started. -->
        <xs:element minOccurs="0" name="reasonCode" type="xs:string"/>
        <!-- Inputs -->
        <!-- Type of step.
             An executor specific to this type will be invoked. What that will do
             in turn will depend on the type. Some may invoke their own harness,
             such as in the ConfiguationAction case, to satisfy a documented API.
             Others may be private to OCP only. -->
        <xs:element name="type" type="xs:string"/>
        <!-- Key/value pairs holding data required by this particular step. -->
        <xs:element minOccurs="0" maxOccurs="unbounded" name="parameter"
type="Parameter"/>
        <!-- Whether/how execution should proceed if the step fails. -->
        <xs:element name="onFailure" type="xs:string"/>
        <!-- Results -->
        <!-- Start time, for profiling purposes. Epoch time, output by java Date.
             Not required if execution has not yet started. -->
        <xs:element minOccurs="0" name="startTime" type="xs:string"/>
        <!-- End time, for profiling purposes. Epoch time, output by java Date.
             Not required if execution has not yet started. -->
        <xs:element minOccurs="0" name="endTime" type="xs:string"/>
    </xs:sequence>
    <xs:attribute use="required" name="id" type="xs:string"/>
</xs:complexType>
<!-- Key/value pairs used to drive execution.
     It is expected that keys are unique among all parameters given that
     step. Parameters can be multivalued, and are marked as such if this
     is possible (not only in the case where multiple values are actually
     set). A parameter does not have to have a value, in which case the
     value is generally assumed "null".
     Additional semantics which may apply to a given step type can be
     enforced by that type (for example, if it cares to consider
     value-unset and value-set-null as distinct). -->
<xs:complexType name="Parameter">
    <xs:sequence>
        <xs:element name="name" type="xs:string"/>
        <xs:element minOccurs="0" name="multivalued" type="xs:boolean"/>
        <xs:element minOccurs="0" maxOccurs="unbounded" name="value" type="xs:string"/>
    </xs:sequence>
</xs:complexType>
</xs:schema>
```

An example execution plan is similarly provided below. This example takes the earlier metadata example and runs it through plan generation. Note how the individual actions have been translated into a larger number of steps, and how the elements driving those have been translated into parameters. Detailed description of some elements are provided in the next section.

```
<?xml version="1.0" encoding="UTF-8" standalone="yes"?>
<executionPlan modificationTime="20140326215743Z" creationTime="20140326215743Z"
id="42b44473-883c-4459-830a-dd8931321874">
    <schemaVersion>1.0</schemaVersion>
    <operation>patch-applyconfig</operation>
    <status>RUNNING</status>
    <parameter>
        <name>patchDir</name>
        <value>/u01/oracle/lcmdir/lcmconfig/patch/patches/1393900504027</value>
    </parameter>
    <parameter>
        <name>phase</name>
        <value>offline</value>
    </parameter>
```

```xml
<parameter>
   <name>idmpatch-sessionId</name>
   <value>1393900504027</value>
</parameter>
<parameter>
   <name>idmpatch-stepNumber</name>
   <value>3.3.7</value>
</parameter>
<step id="4dc93b04-a1b6-4847-b926-baf795b1f78b">
   <number>1.1.1</number>
   <status>COMPLETE</status>
   <reasonCode>EXEC_SUCCESS</reasonCode>
   <type>OPatchPrerequisiteStep</type>
   <parameter>
      <name>patchId</name>
      <value>1234567</value>
   </parameter>
   <onFailure>STOP</onFailure>
   <startTime>1395364258725</startTime>
   <endTime>1395364258739</endTime>
</step>
<step id="9c60c91e-660b-4f01-aa44-893cb6c3f4b0">
   <number>1.2.1</number>
   <status>COMPLETE</status>
   <reasonCode>EXEC_SUCCESS</reasonCode>
   <type>ConfigChangeInventoryPrerequisiteStep</type>
   <parameter>
      <name>type</name>
      <value>RECORDED_ACTIONS </value>
   </parameter>
   <parameter>
      <name>key</name>
      <value>oracle.idm.oam.FeatureXDomainWiring</value>
   </parameter>
   <onFailure>STOP</onFailure>
   <startTime>1395364258739</startTime>
   <endTime>1395364258743</endTime>
</step>
<step id="5d11c7ac-20f1-4f9c-a1c4-a392fc45b1e8">
   <number>1.2.2</number>
   <status>COMPLETE</status>
   <reasonCode>EXEC_SUCCESS</reasonCode>
   <type>ConfigChangeInventoryPrerequisiteStep</type>
   <parameter>
      <name>type</name>
      <value>RECORDED_ACTIONS </value>
   </parameter>
   <parameter>
      <name>key</name>
      <value>oracle.idm.oam.FeatureYDomainWiring</value>
   </parameter>
   <parameter>
      <name>comparator</name>
      <value>exactMatch</value>
   </parameter>
   <onFailure>STOP</onFailure>
   <startTime>1395364258743</startTime>
   <endTime>1395364258747</endTime>
</step>
<step id="7b16d902-356f-458d-832f-309d93e1d145">
   <number>2.1.1</number>
   <status>PENDING</status>
   <type>ConfigurationActionStep</type>
   <parameter>
      <name>name</name>
      <value>oracle.configpatch.actions.builtin.BackupAction</value>
   </parameter>
   <parameter>
      <name>description</name>
      <value>Backs up the domain config.xml</value>
   </parameter>
   <parameter>
      <name>patchid</name>
      <value>1234567</value>
   </parameter>
   <parameter>
      <name>actionParam_FROM_FILE</name>
      <value>%DOMAIN_HOME%/config/config.xml</value>
   </parameter>
```

```xml
    <parameter>
      <name>actionParam_TO_FILE</name>
      <value>%DOMAIN_HOME%/config/ocp-backup/config.xml.%PATCH_ID%</value>
    </parameter>
    <onFailure>STOP</onFailure>
  </step>
  <step id="8d7df416-3f3a-4200-813e-2970c83371cb">
    <number>2.2.1</number>
    <status>PENDING</status>
    <type>ConfigurationActionStep</type>
    <parameter>
      <name>name</name>
      <value>oracle.configpatch.actions.builtin.AddFeatureZToConfigXML</value>
    </parameter>
    <parameter>
      <name>description</name>
      <value>Adds new "feature Z" wiring to the domain config.xml</value>
    </parameter>
    <parameter>
      <name>patchid</name>
      <value>1234567</value>
    </parameter>
    <parameter>
      <name>classpath</name>
      <multivalued>true</multivalued>
<value>%MW_HOME%/oracle_common/modules/oracle.xdk_11.1.0/xmlparserv2.jar</value>
      <value>%MW_HOME%/oracle_common/modules/org.jaxen_1.1.1.jar</value>
    </parameter>
    <onFailure>STOP</onFailure>
  </step>
  <step id="182fi34a4-722e-4138-9c33-0d16101c2868">
    <number>2.2.2</number>
    <status>PENDING</status>
    <type>ConfigChangeInventoryAdditionStep</type>
    <parameter>
      <name>type</name>
      <value>RECORDED_ACTIONS </value>
    </parameter>
    <parameter>
      <name>key</name>
      <value>oracle.idm.oam.FeatureZDomainWiring</value>
    </parameter>
    <onFailure>STOP</onFailure>
  </step>
  <step id="82463617-02b8-42f9-b193-aac944ad06da">
    <number>2.3.1</number>
    <status>PENDING</status>
    <type>ConfigurationActionScriptStep</type>
    <parameter>
      <name>name</name>
      <value>%ORACLE_HOME%/oam/patch/enableFeatureZ</value>
    </parameter>
    <parameter>
      <name>description</name>
      <value>Enables "feature Z" for OAM</value>
    </parameter>
    <parameter>
      <name>patchid</name>
      <value>1234567</value>
    </parameter>
    <parameter>
      <name>actionParam_DOMAIN_HOME</name>
      <value>%DOMAIN_HOME%</value>
    </parameter>
    <parameter>
      <name>actionParam_DEBUG</name>
      <value>false</value>
    </parameter>
    <onFailure>WARN</onFailure>
  </step>
</executionPlan>
```

Again continuing with FIG. 5, block 515 includes the execution of the configuration patches according to the determined patching plan determined in block 510:

(3) Execution of the Created Plan.

In plan execution the decomposed steps which make up the plan are run. This may be a partial execution of some step groups (e.g., if the "prereq" command was invoked or if the "apply" command was invoked with a phase indicator of "offline") or a full execution of all step groups (e.g., if "apply" was invoked with no phase indicator). In either case, in some embodiments steps are executed using a harness that implements a state machine, providing at all times simple and consistent execution status, and the ability to report the same.

As mentioned above, in some embodiments steps that appear in the plan have been bucketed with like steps which all need to be executed conceptually at "the same time". This does not mean to say that steps within a particular group are unordered, as there can be dependencies in some cases between steps in a given group. For example, a step that adds an entry to the change inventory needs to be run after the step which actually makes the change being recorded runs to completion. In some embodiments, all steps are strictly ordered at the time of plan generation and are executed in that order serially.

Figure 7A:
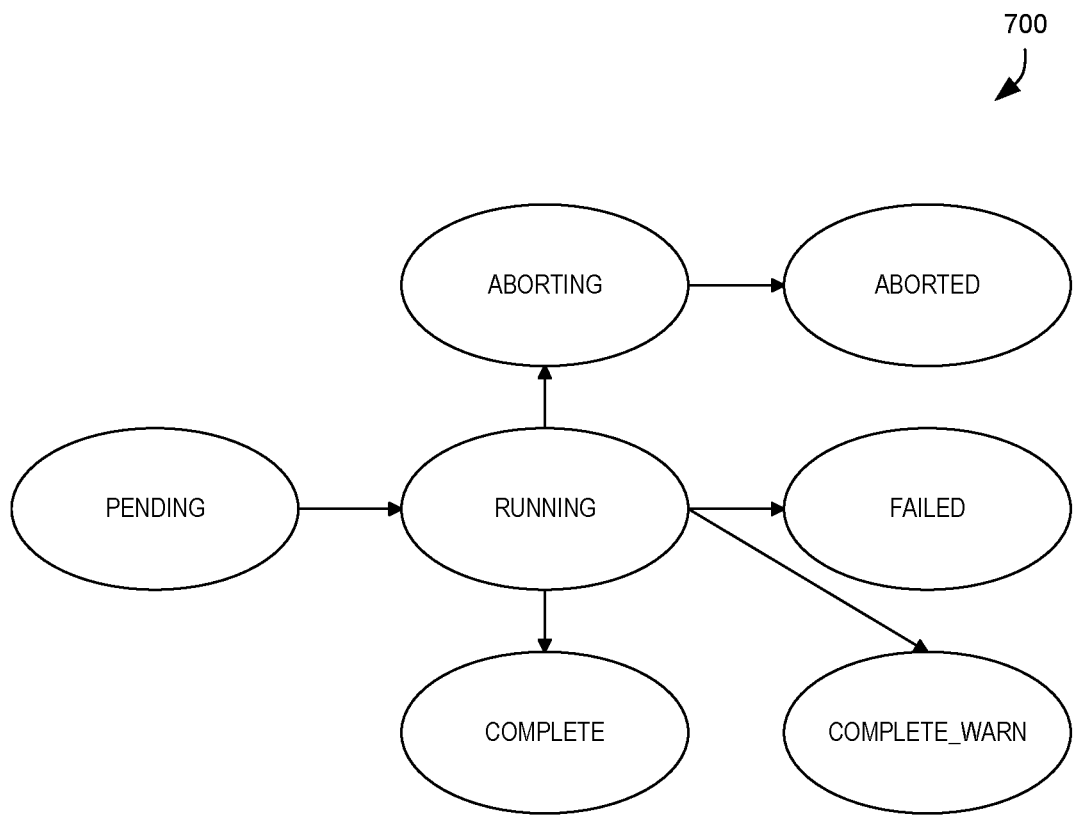
FIGS. 7A and 7B illustrate two state diagrams depicting state transitions of the configuration patch module according to some embodiments.
Figure 7B:
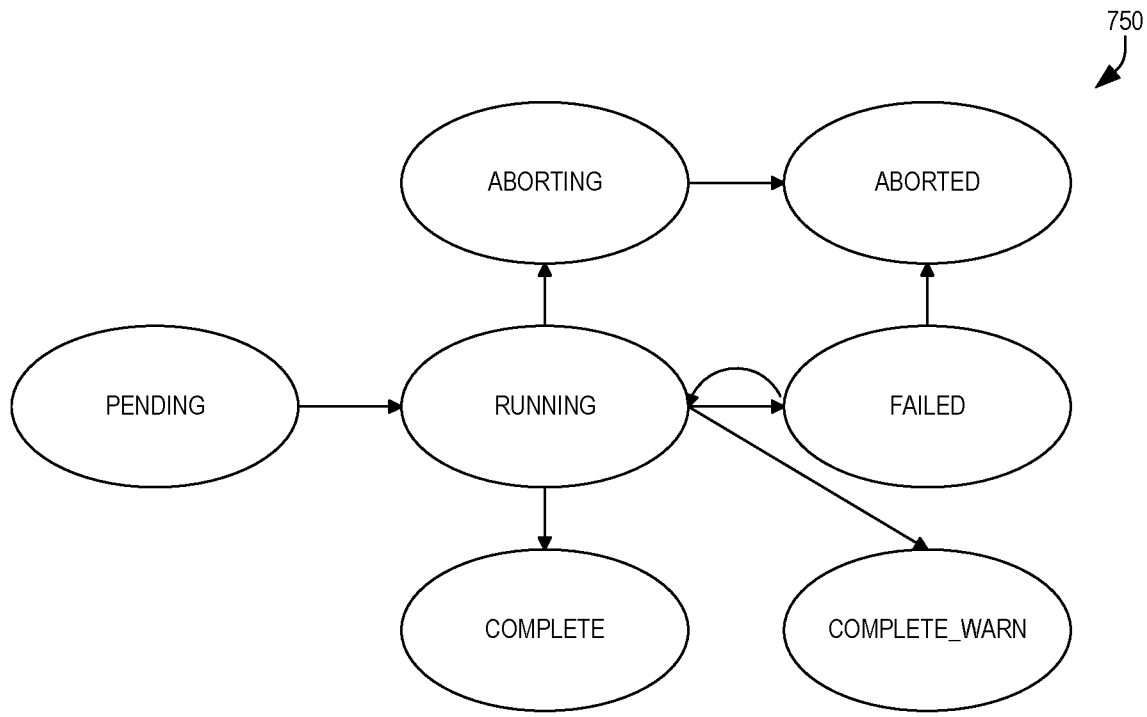

Thus, execution may implement a state-machine model as illustrated in FIGS. 7A and 7B. FIGS. 7A and 7B illustrate two state diagrams (e.g., state diagram 700 and state diagram 750) depicting state transitions of the configuration patch module according to some embodiments.

As shown in state diagram model 700, when a plan is first generated, it is in state PENDING—nothing has yet been run. Once execution of any step begins, state becomes RUNNING.

From RUNNING, one of several outcomes can occur. Each of those can be terminal states.

For example, in-progress execution might be halted, such as an orchestration tool being shut down or perhaps the machine is going down. This moves the state to ABORTING, and then to ABORTED once the in-progress step is no longer executing. That can happen in one of two ways: either due it being interrupted, if that is possible to do safely, or when it has run to completion, if interrupting it cleanly is not possible.

Additionally, execution of a step may fail for a step that declares that its failure is to halt overall plan execution (it has an onFailure of STOP). This can move the state to FAILED. In some embodiments, an administrator may diagnose the cause of the failures and after resolution repeat the run.

Additionally, if execution of all steps completes, but one of more steps declaring that their failure should result in warning to the admin (an onFailure of WARN). This moves the state to COMPLETE_WARN. The administrator may be directed to look into the warnings.

Also, execution of all steps may complete without issue. For example, in some configurations one or more steps may have failed, but failure of those steps is of no consequence (an onFailure of CONTINUE). This moves the state to COMPLETE.

In some embodiments utilizing stateful sessions, retry support can be provided. Thus, state diagram 750 illustrates when a state of FAILED is reached, instead of creating a new plan and executing that again from scratch, the session may be allowed to resume from the point at which it failed, requiring that the step which failed be re-run. This can provide improved usability and reporting (due to the continuity of a single session used across both invocations), and save time as no steps which had already completed need to be run a second time.

Thus, in the diagram 750 FAILED is no longer a terminal state, but on retry can be changed back to RUNNING, or (if retry is not attempted, or the failure persists) a failed session can then be ABORTED. In this case ABORTING is bypassed, as in FAILED no execution is in progress.

Figure 8:
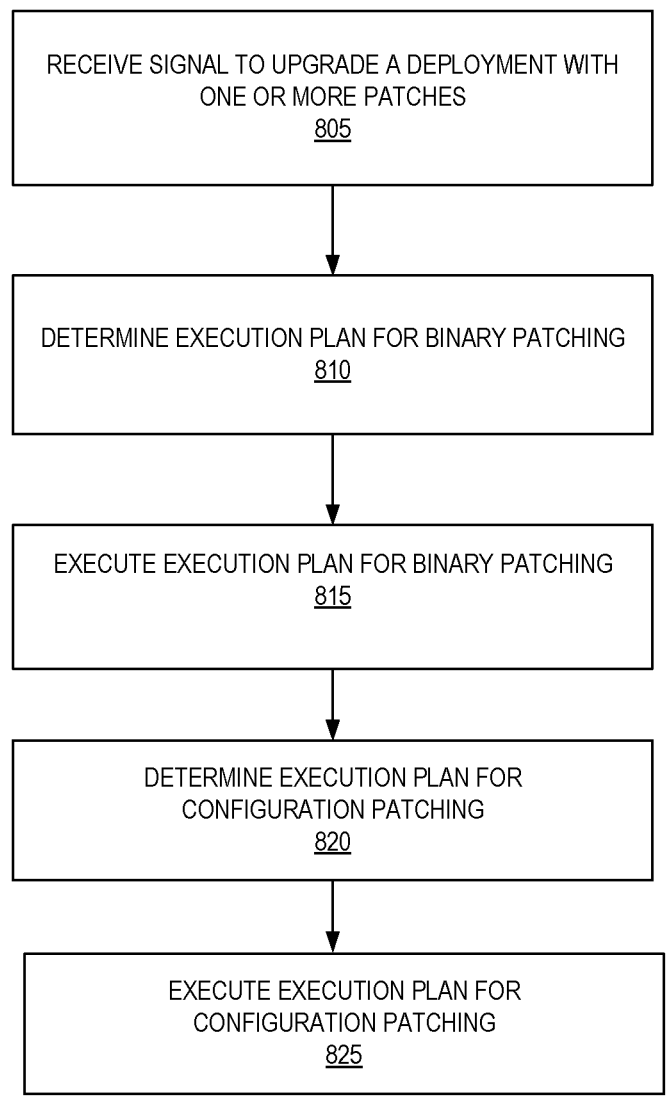
FIG. 8 illustrates an exemplary flow for an overall binary and configuration patching process according to some other embodiments.

FIG. 8 illustrates another exemplary flow for an overall binary and configuration patching process according to some other embodiments. The flow of FIG. 8 is similar to FIG. 4, however, the determination and execution of the configuration patching is performed at a same time and is not performed separately for each phase (e.g., online and/or offline).

Further, in the flow of FIG. 8, both an offline phase and an online phase, only an offline phase, or only an online phase can be performed. For example, the flow of FIG. 8 can be used in, for example, a zero downtime (ZDT) flow. That is, actions that are only eligible for an online phase may be performed.

As shown in FIG. 8, at step 805, a signal is received indicating that a deployment should be upgraded with a set of one or more patches. A deployment can include activities that make a software system available for use. A deployment can be, for example, a Software as a Service (SaaS) deployment.

A deployment can contain the contents of one or more installers or installer contents, which can represent one or more applications or products. The one or more applications or products can all be in one location and can be managed as a single entity. Further, the one or more applications or products can be on one piece of hardware or across multiple pieces of hardware, depending on, for example, a web logic domain construction.

A deployment can be in a plurality of different states. For example, a deployment can be in a state in which no patches have been applied (e.g., no patch state) or a state in which one or more patches have been previously applied (e.g., previously patched state).

A deployment can consist of both product binaries and configuration. The combination of the binaries and the configuration can be called an application. The binaries and the configuration can be deployed on a certain set of hardware resources. For example, the binary and the configuration can be deployed on one or more hardware resources. A configuration can include file-based configurations and database configurations.

At step 810, an execution plan can be generated for binary patching. At step 815, the execution plan for patching the binaries can be performed.

At step 820, an execution plan can be generated for configuration patching. The steps for determining a configuration patching plan are explained in more detail with respect to FIG. 9.

Further, although FIG. 8 illustrate that binary patching is performed before configuration patching, configuration patching may be performed before binary patching. Further, configuration patching may be performed without performing binary patching. That is, configuration patching can be performed without doing binary patching. In addition, the steps of FIG. 8 can be modified according to a stopping and starting of servers.

Figure 9:
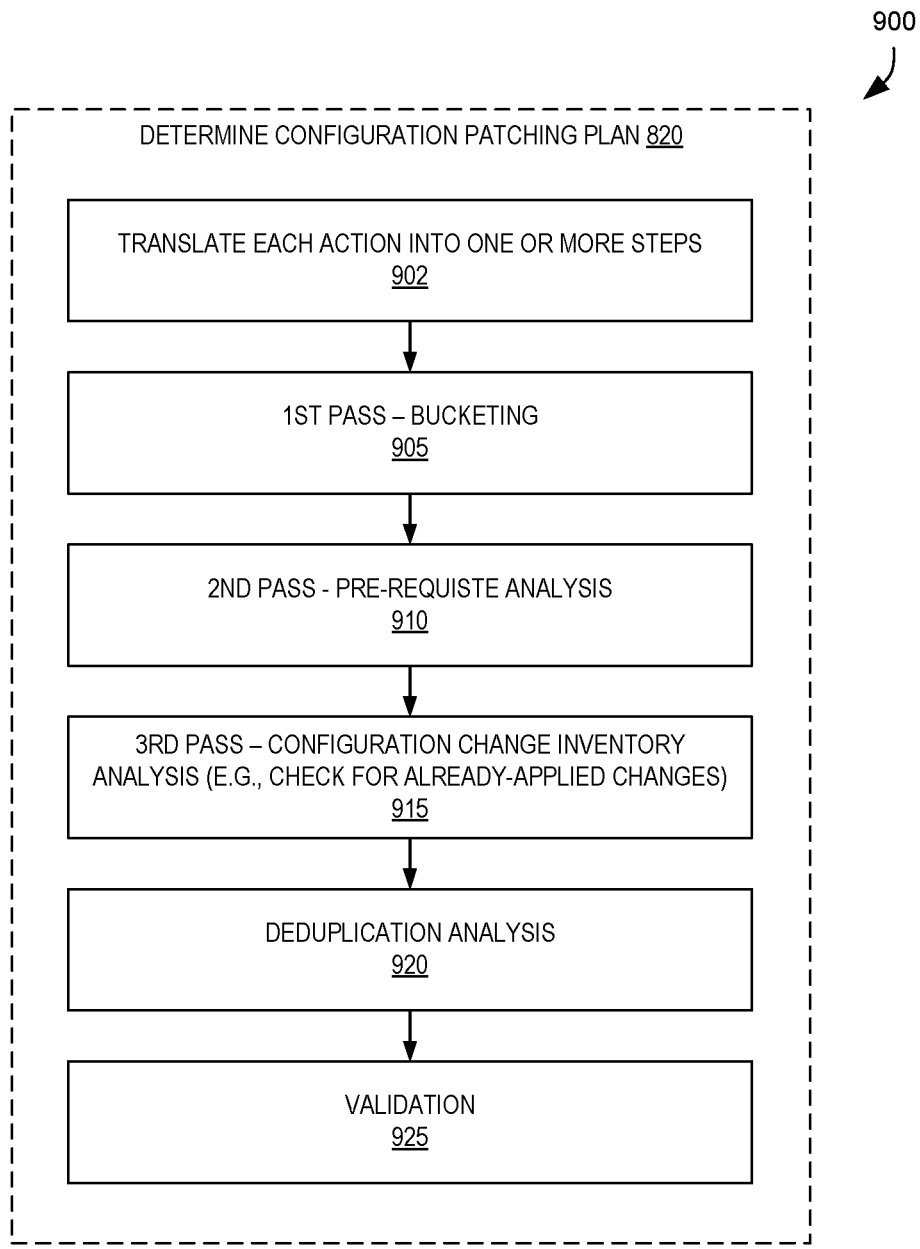
FIG. 9 illustrates an exemplary flow for determining a configuration patching plan according to some other embodiments.

FIG. 9 illustrates an exemplary flow for determining a configuration patching plan according to some embodiments. FIG. 9 is similar to FIG. 6, however, the generation of the configuration patching plan is performed at block 820. Blocks 902, 905, 910, 915, 920 and 925 can correspond to, for example, blocks 602, 605, 610, 615, 620 and 625, respectively. Therefore, the description of blocks 602, 605, 610, 615, 620 and 625 can apply to blocks 902, 905, 910, 915, 920 and 925, respectively.

After determining the configuration patching plan, the execution plan for configuration patching as determined in step 820 can be applied at step 825. The execution plan for the binaries as determined in step 810 can be performed prior to generating and/or performing the execution plan for configuration patching. Therefore, the product configuration can be patched to align with the binary patch that is applied.

FIGS. 10A, 10B, and 10C illustrate example metadata according to some embodiments. FIGS. 10A and 10B illustrate example metadata 1000. FIG. 10C illustrates example metadata 1050. The example metadata 1000 and metadata 1050 can be, for example, fragments of metadata. Metadata 1000 and metadata 1050 include patch metadata, precondition inventory contents, and post condition inventory contents.

As shown in FIGS. 10A and 10B, metadata 1000 shows a cumulative patch model for a particular product. A first cumulative patch 1001 can include two actions (e.g., a cumulative patch), such as an idempotent action and a persisted action which will be recorded to inventory on successful completion. A new cumulative patch can replace the first patch. The new cumulative patch (e.g., second cumulative patch 1002) can include a third action which depends on the previous persisted action and is itself a persisted action.

In the event a customer brings up a new deployment, when patching flow is run against the deployment and provided solely the now-current, second cumulative patch 1002, since no patches/actions were previously applied, all three actions will be run. The producer/consumer relationship between the two non-idempotent actions will be satisfied during this single run.

In the event a customer has an existing deployment, that is, they had applied the first cumulative patch 1001 earlier when it was current, and they are presently going to apply now-current patch 1002, only two actions will be run (the idempotent action and the newly-added persisted action). The inventory indicates that the first persisted action had already been run, so the dependency the second action has on the first action is satisfied.

In both cases (e.g., customer brings up a new deployment or has an existing deployment) the effect is the same in that both actions are applied. However the resulting inventory contents are different as the first action was effected using a physically distinct patch and action declaration, and the timings are also different. That is, different metadata files can be used to perform a particular action. For example, different code and/or newer code may be used in the second cumulative patch 1002 to effect the same change which can be performed by the action present in the first patch 1001.

At a future date, a subsequent cumulative patch (e.g., a third cumulative patch (not shown)) can be issued which replaces the current cumulative patch. The subsequent cumulative patch may include more actions. In applying the subsequent cumulative actions against an existing deployment, neither of the two persisted actions which have been run and recorded will be run at that time, that is, they will be skipped. If any of the new actions depend on inventory entries they had written, those dependencies will be satisfied and those new actions can be run.

FIG. 10C illustrates an example of metadata 1050. As shown in FIG. 10C, multiple unrelated patches (e.g., patch 1051 and patch 1052) are applied. Specifically, FIG. 10 illustrates two patches, each with an action to be recorded. One patch depends on a previous run of some persisted action not included in either of the two patches, which was expected to write an entry named "oracle.myproduct.DB-TunablesEnabled" to the inventory. Both patches also declare an identical idempotent action which needs to be run at "the end".

In the event a customer is bringing up a new deployment and applying the patches of FIG. 10C as the first two patches, plan generation can fail because the dependency will not be satisfied. That is, a patch performing that persisted action has not been run and it not present in these patches.

In the event a customer has an existing deployment and they had previously applied the patch performing the action on which a current action depends, the dependency is satisfied. The configuration plan can be generated with the two idempotent actions folded into a single action.

Computer Systems

Figure 11:
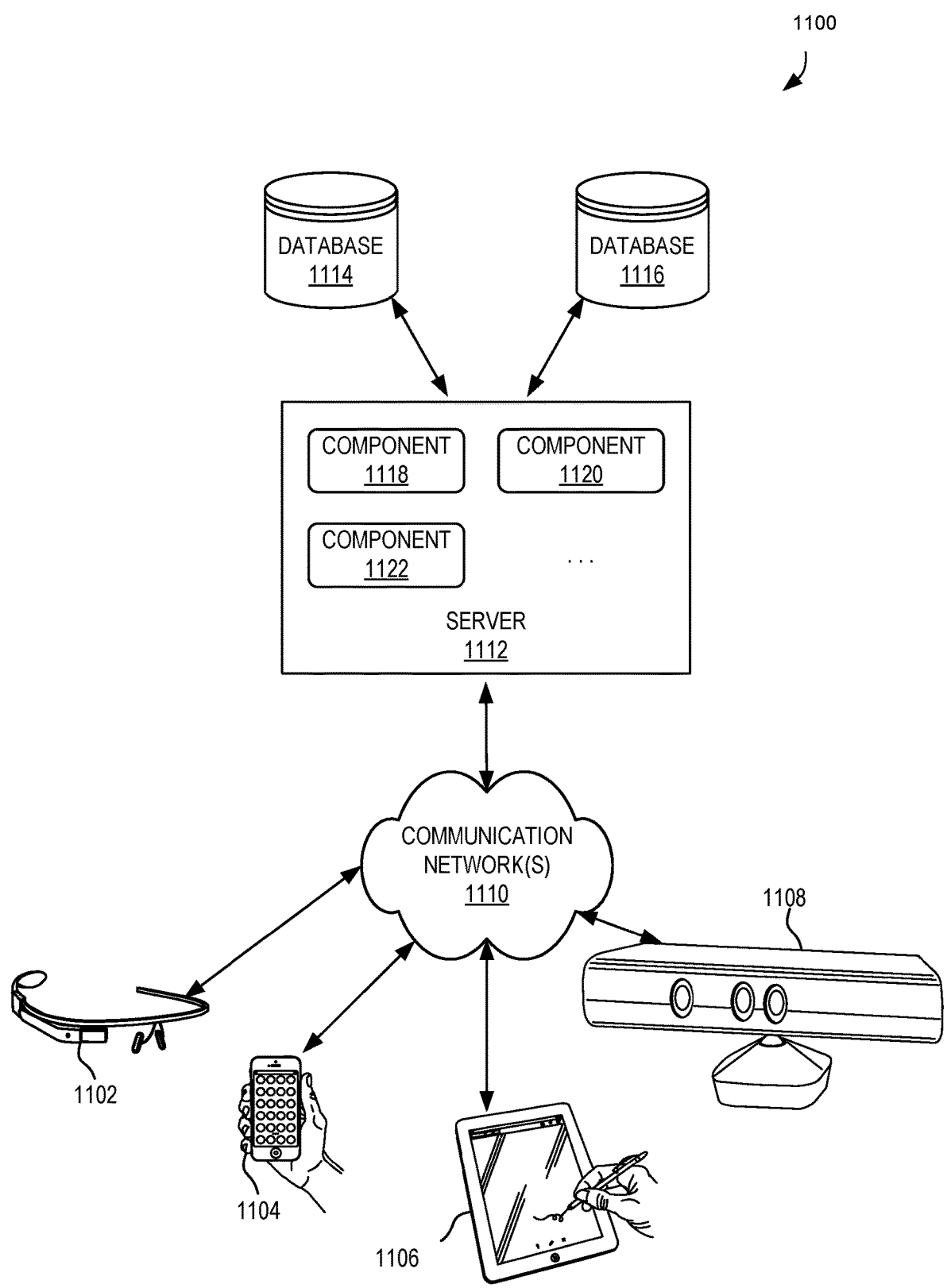
FIG. 11 illustrates a simplified diagram of a distributed system for implementing some embodiments.
Figure 12:
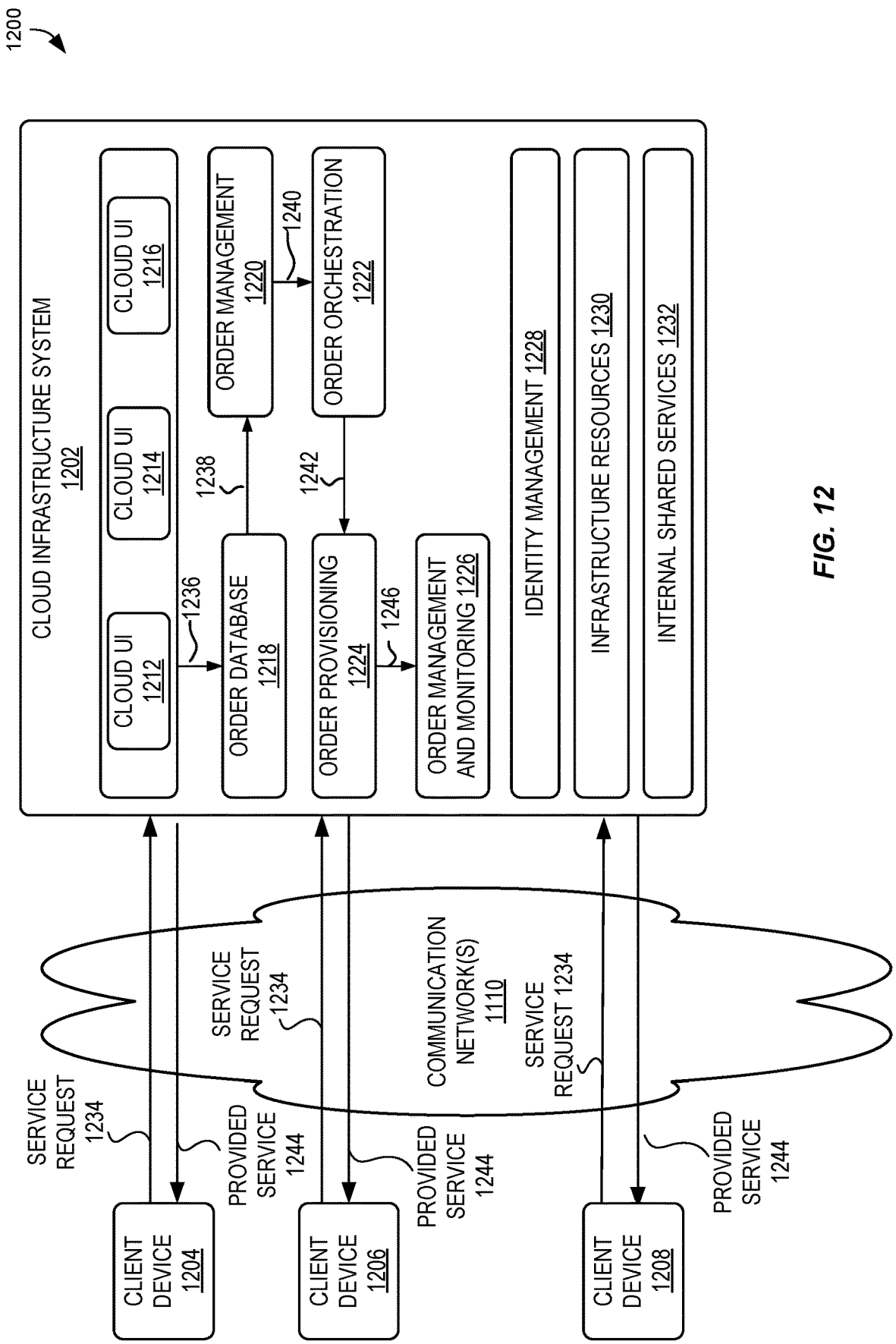
FIG. 12 is a simplified block diagram of one or more components of a system environment in which services may be offered as cloud services, in accordance with some embodiments.
Figure 13:
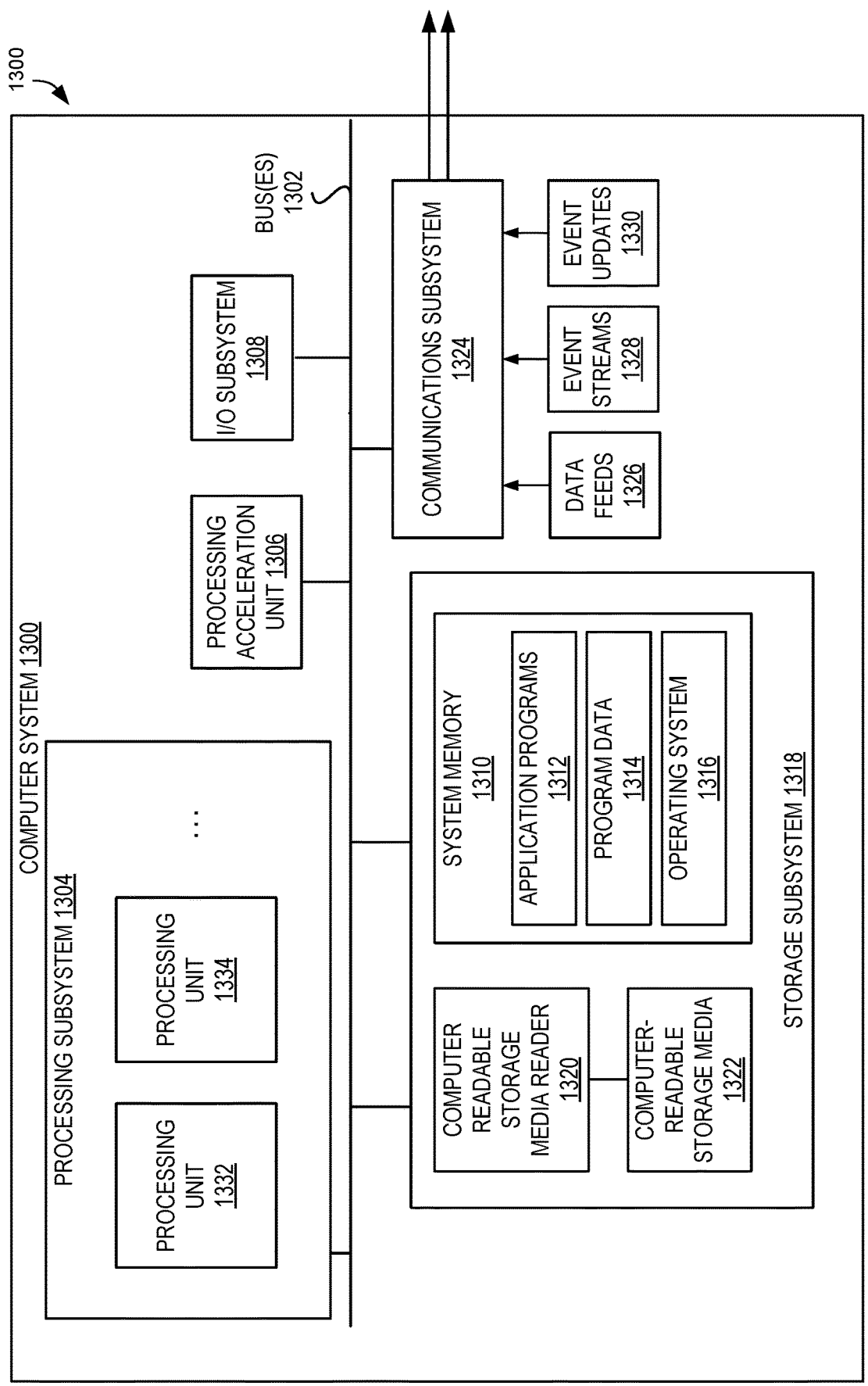
FIG. 13 illustrates an exemplary computer system that may be used to implement certain components according to some embodiments.

FIGS. 11, 12, and 13 illustrate exemplary hardware and/or software configurations used in various embodiments.

FIG. 11 illustrates a simplified diagram of a distributed system for implementing some embodiments of the present invention. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications such as services and applications that provide code and/or data for performing efficient application configuration patching for applications executing at the server 1112 or another server. In certain embodiments, server 1112 may also provide other services or software applications that can include non-virtual and virtual environments. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, software components 1118, 1120 and 1122 of system 1100 are shown as being implemented on server 1112. As one example, one or more of the components (e.g., software component 1118) may be the configuration patch module or binary patch module discussed throughout the application.

In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

Client computing devices 1102, 1104, 1106, and/or 1108 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1110.

Although distributed system 1100 in FIG. 11 is shown with four client computing devices, any number of client computing devices may be supported. Other devices, such as devices with sensors, etc., may interact with server 1112.

Communication network(s) 1110 in distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various embodiments, server 1112 may be adapted to run one or more services or software applications described in the foregoing disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1100 may also include one or more databases 1114 and 1116. These databases may provide a mechanism for storing information such as user interactions information, usage patterns information, adaptation rules information, and other information used by embodiments of the present invention. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands. However, databases 1114 and 1116 may provide relational databases, object-oriented databases, object-relational databases, NoSQL databases, etc., and may or may not be SQL-based. For example, databases 1114 and/or 1116 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 12 is a simplified block diagram of one or more components of a system environment 1200 in which services may be offered as cloud services, in accordance with some embodiments of the present disclosure. In the illustrated embodiment in FIG. 12, system environment 1200 includes one or more client computing devices 1204, 1206, and 1208 that may be used by users to interact with a cloud infrastructure system 1202 that provides cloud services. Additionally, in some embodiments the "client" computing devices 1204, 1206, 1208 may actually be server computers acting as a client in a client-server relationship, where the server may provide application configuration patching services. Cloud infrastructure system 1202 may comprise one or more computers and/or servers that may include those described above for server 1112.

It should be appreciated that cloud infrastructure system 1202 depicted in FIG. 12 may have other components than those depicted. Further, the embodiment shown in FIG. 12 is one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108. Client computing devices 1204, 1206, and 1208 may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202. Although exemplary system environment 1200 is shown with three client computing devices, any number of client computing devices may be supported. Other devices such as devices with sensors, etc. may interact with cloud infrastructure system 1202.

Communication network(s) 1110 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for communication network(s) 1110.

In certain embodiments, services provided by cloud infrastructure system 1202 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1202 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle Corporation) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform, and other resources.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 to enable provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1202, and the like.

In one embodiment, as depicted in FIG. 12, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In an exemplary operation, at 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI) such as cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

At 1236, the order information received from the customer may be stored in an order database 1218. If this is a new order, a new record may be created for the order. In one embodiment, order database 1218 can be one of several databases operated by cloud infrastructure system 1218 and operated in conjunction with other system elements.

At 1238, the order information may be forwarded to an order management module 1220 that may be configured to perform billing and accounting functions related to the order, such as verifying the order, and upon verification, booking the order.

At 1240, information regarding the order may be communicated to an order orchestration module 1222 that is configured to orchestrate the provisioning of services and resources for the order placed by the customer. In some instances, order orchestration module 1222 may use the services of order provisioning module 1224 for the provisioning. In certain embodiments, order orchestration module 1222 enables the management of business processes associated with each order and applies business logic to determine whether an order should proceed to provisioning.

As shown in the embodiment depicted in FIG. 12, at 1242, upon receiving an order for a new subscription, order orchestration module 1222 sends a request to order provisioning module 1224 to allocate resources and configure resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. This enables order orchestration module 1222 to be isolated from implementation details, such as whether or not services and resources are actually provisioned on the fly or pre-provisioned and allocated/assigned upon request.

At 1244, once the services and resources are provisioned, a notification may be sent to the subscribing customers indicating that the requested service is now ready for use. In some instance, information (e.g. a link) may be sent to the customer that enables the customer to start using the requested services.

At 1246, a customer's subscription order may be managed and tracked by an order management and monitoring module 1226. In some instances, order management and monitoring module 1226 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1200 may include an identity management module 1228 that is configured to provide identity services, such as access management and authorization services in cloud infrastructure system 900. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

FIG. 13 illustrates an exemplary computer system 1300 that may be used to implement certain components according to some embodiments of the present invention. In some embodiments, computer system 1300 may be used to implement any of the various servers and computer systems described above. As shown in FIG. 13, computer system 1300 includes various subsystems including a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors (GPUs), digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1322 including potentially on one or more storage devices. Through suitable programming, processing subsystem 1304 can provide various functionalities described above for performing efficient application configuration patching operations.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the present invention.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
   receiving, at a configuration patch module executing at a computing device, a set of one or more binary patches for patching binary portions in one or more applications, and a set of one or more patch metadata declarations for the one or more applications which correspond to at least one of the binary patches, wherein each patch metadata declaration of the set of patch metadata declarations indicates an action to be performed to modify configuration data associated with the one or more applications, and wherein the configuration data comprises non-binary data;
   identifying, from the set of patch metadata declarations, a set of one or more actions;
   generating, by the configuration patch module, a configuration patching execution plan including a set of one or more steps to be performed to implement the set of actions, wherein the configuration patching execution plan comprises an online phase for executing online actions and an offline phase for executing offline actions,
   wherein the online phase for executing online actions comprises:
      executing an online binary patching; and
      executing an online configuration patching,
   wherein the online actions comprise actions that are configured to be performed while a server is online,
   wherein the offline phase for executing offline actions comprises:
      executing an offline binary patching; and
      executing an offline configuration patching,
   wherein the offline actions comprise actions that are configured to be pertformed while the server is offline; and
   executing, by the configuration patch module, the set of steps of the configuration patching execution plan in order to modify the configuration data in accordance with the received one or more binary patches.

2. The method of claim 1, wherein said generating of the configuration patching execution plan utilizes a deterministic algorithm.

3. The method of claim 1, wherein said generating the configuration patching execution plan further comprises:
   translating, by the configuration patch module, each action of the set of actions into one or more steps to yield a set of candidate steps;
   determining, by the configuration patch module, that a first step of the set of candidate steps has already been executed; and
   removing, by the configuration patch module, the first step from the set of candidate steps.

4. The method of claim 3, wherein said determining that the first step of the set of candidate steps has already been executed comprises:
   searching, by the configuration patch module, for an identifier of the first step within an inventory of previously-executed steps.

5. The method of claim 3, wherein said generating the configuration patching execution plan further comprises:
   determining, by the configuration patch module, that the first step of the set of candidate steps that is ordered before a second step of the set of candidate steps depends upon a second action step; and moving the second step ahead of the first step within the set of candidate steps.

6. The method of claim 3, wherein the set of steps of the configuration patching execution plan includes all steps remaining in the set of candidate steps at an end of the configuration patching execution plan determination process.

7. The method of claim 1, further comprising:
recording, for each executed step of the set of steps of the configuration patching execution plan, an entry in a configuration change inventory indicating that the step has been executed.

8. A non-transitory computer-readable storage medium storing instructions which, when executed by one or more processors of a computing device, cause the one or more processors to perform a method comprising:
receiving, at a configuration patch module executing at the computing device, a set of one or more binary patches for patching binary portions in one or more applications, and a set of one or more patch metadata declarations for the one or more applications which correspond to at least one of the binary patches, wherein each patch metadata declaration of the set of patch metadata declarations indicates an action to be performed to modify configuration data associated with the one or more applications, and wherein the configuration data comprises non-binary data;
identifying, from the set of patch metadata declarations, a set of one or more actions;
generating, by the configuration patch module, a configuration patching execution plan including a set of one or more steps to be performed to implement the set of actions, wherein the configuration patching execution plan comprises an online phase for executing online actions and an offline phase for executing offline actions,
wherein the online phase for executing online actions comprises:
executing an online binary patching; and
executing an online configuration patching,
wherein the online actions comprise actions that are configured to be performed while a server is online,
wherein the offline phase for executing offline actions comprises:
executing an offline binary patching; and
executing an offline configuration patching,
wherein the offline actions comprise actions that are configured to be performed while the server is offline; and
executing, by the configuration patch module, the set of steps of the configuration patching execution plan in order to modify the configuration data in accordance with the received one or more binary patches.

9. The computer-readable storage medium of claim 8, wherein said generating of the configuration patching execution plan utilizes a deterministic algorithm.

10. The computer-readable storage medium of claim 8, wherein said generating the configuration patching execution plan further comprises:
translating, by the configuration patch module, each action of the set of actions into one or more steps to yield a set of candidate steps;
determining, by the configuration patch module, that a first step of the set of candidate steps has already been executed; and
removing, by the configuration patch module, the first step from the set of candidate steps.

11. The computer-readable storage medium of claim 10, wherein said determining that the first step of the set of candidate steps has already been executed comprises:
searching, by the configuration patch module, for an identifier of the first step within an inventory of previously-executed steps.

12. The computer-readable storage medium of claim 10, wherein said generating the configuration patching execution plan further comprises:
determining, by the configuration patch module, that the first step of the set of candidate steps that is ordered before a second step of the set of candidate steps depends upon a second action step; and
moving the second step ahead of the first step within the set of candidate steps.

13. The computer-readable storage medium of claim 10, wherein the set of steps of the configuration patching execution plan includes all steps remaining in the set of candidate steps at an end of a configuration patching execution plan determination process.

14. The computer-readable storage medium of claim 8, wherein the generating the configuration patching execution plan is performed during one of the offline phase and the online phase.

15. A computing device, comprising:
a memory; and
one or more processors configured to:
receive, at a configuration patch module executing at the computing device, a set of one or more binary patches for patching binary portions in one or more applications, and a set of one or more patch metadata declarations for the one or more applications which correspond to at least one of the binary patches, wherein each patch metadata declaration of the set of patch metadata declarations indicates an action to be performed to modify configuration data associated with the one or more applications, and wherein the configuration data comprises non-binary data;
identify, from the set of patch metadata declarations, a set of one or more actions;
generate, by the configuration patch module, a configuration patching execution plan including a set of one or more steps to be performed to implement the set of actions, wherein the configuration patching execution plan comprises an online phase for executing online actions and an offline phase for executing offline actions,
wherein the online phase for executing online actions comprises:
executing an online binary patching; and
executing an online configuration patching,
wherein the online actions comprise actions that are configured to be performed while a server is online,
wherein the offline phase for executing offline actions comprises:
executing an offline binary patching; and
executing an offline configuration patching,
wherein the offline actions comprise actions that are configured to be performed while the server is offline; and
execute, by the configuration patch module, the set of steps of the configuration patching execution plan in order to modify the configuration data in accordance with the received one or more binary patches.

* * * * *

UNITED STATES PATENT AND TRADEMARK OFFICE
CERTIFICATE OF CORRECTION

Page 1 of 2

PATENT NO. : 10,620,933 B2
APPLICATION NO. : 15/876710
DATED : April 14, 2020
INVENTOR(S) : Banford et al.

It is certified that error appears in the above-identified patent and that said Letters Patent is hereby corrected as shown below:

On the Title Page

Column 2, item (74) under Attorney, Agent, or Firm, Line 2, delete "Sotckton" and insert -- Stockton --, therefor.

Column 2, item (57) under Abstract, Lines 5-6, after "receive" delete "a set of one or more binary patches for one or more applications".

In the Drawings

On sheet 6 of 15, in FIG. 6, under Reference Numeral 610, Line 1, delete "PRE-REQUISTE" and insert -- PRE-REQUISITE --, therefor.

On sheet 9 of 15, in FIG. 9, under Reference Numeral 910, Line 1, delete "PRE-REQUISTE" and insert -- PRE-REQUISITE --, therefor.

In the Specification

In Column 2, Lines 15-16, delete "web site)." and insert -- website). --, therefor.

In Column 10, Line 39, delete "and or" and insert -- and/or --, therefor.

In Column 19, Line 42, after "6" insert -- , --.

In Column 21, Line 59, delete "inventory_." and insert -- inventory. --, therefor.

In Column 21, Line 65, after "itself" insert -- . --.

In Column 23, Line 56, delete "patch2," and insert -- patch 2, --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,620,933 B2

In Columns 31-32, Line 33, delete "fi3" and insert -- f8 --, therefor.

In Column 31, Line 65, delete "Plan." and insert -- Plan --, therefor.

In the Claims

In Column 48, Line 37, in Claim 1, delete "pertformed" and insert -- performed --, therefor.